(12) United States Patent
Sacle et al.

(10) Patent No.: US 8,498,769 B2
(45) Date of Patent: Jul. 30, 2013

(54) METHOD OF SHORT-TERM REJOINING OF A FLIGHT PLAN BY RADAR GUIDANCE OF AN AIRCRAFT

(75) Inventors: Jérôme Sacle, Toulouse (FR); Stéphanie Fortier, Cugnaux (FR); François Coulmeau, Seilh (FR)

(73) Assignee: Thales, Neuilly sur Seine (FR)

( * ) Notice: Subject to any disclaimer, the term of this patent is extended or adjusted under 35 U.S.C. 154(b) by 415 days.

(21) Appl. No.: 12/780,684

(22) Filed: May 14, 2010

(65) Prior Publication Data

US 2010/0324812 A1 Dec. 23, 2010

(30) Foreign Application Priority Data

May 15, 2009 (FR) ...................................... 09 02364

(51) Int. Cl.
*G01C 22/00* (2006.01)
(52) U.S. Cl.
USPC .................................... 701/26; 701/3; 701/11
(58) Field of Classification Search
USPC .................................................. 701/3, 11, 26
See application file for complete search history.

(56) References Cited

U.S. PATENT DOCUMENTS

| | | | | |
|---|---|---|---|---|
| 5,797,106 | A * | 8/1998 | Murray et al. ................... | 701/11 |
| 6,163,744 | A * | 12/2000 | Onken et al. ...................... | 701/3 |
| 6,922,631 | B1 * | 7/2005 | Dwyer et al. .................. | 701/528 |
| 7,010,398 | B2 * | 3/2006 | Wilkins et al. .................... | 701/3 |
| 7,024,287 | B2 * | 4/2006 | Peckham et al. .................. | 701/3 |
| 7,089,091 | B2 * | 8/2006 | Artini et al. ....................... | 701/3 |
| 7,603,209 | B2 * | 10/2009 | Dwyer et al. ................... | 701/14 |
| 7,711,457 | B2 * | 5/2010 | Caillaud ........................... | 701/5 |
| 8,086,362 | B2 * | 12/2011 | Dupre et al. ................... | 701/14 |
| 8,108,186 | B2 * | 1/2012 | Caillaud et al. .................. | 703/3 |
| 8,155,805 | B2 * | 4/2012 | Spek .............................. | 701/14 |
| 2006/0025899 | A1 | 2/2006 | Peckham et al. | |
| 2009/0076717 | A1 * | 3/2009 | Goutelard et al. ............ | 701/122 |
| 2009/0076721 | A1 | 3/2009 | Coulmeau et al. | |

FOREIGN PATENT DOCUMENTS

FR 2921152 A1 3/2009
FR 2921153 A1 3/2009

* cited by examiner

*Primary Examiner* — Hussein A. Elchanti
(74) *Attorney, Agent, or Firm* — Baker & Hostetler, LLP

(57) ABSTRACT

Method of formulating a lateral flight trajectory for the rejoining by an aircraft (200) of a trajectory of a flight plan (910) comprising a plurality of waypoints (911, 912, 913), the aircraft (200) flying outside of the flight plan (910) and according to a divergent track with respect to the trajectory of the flight plan (210), characterized in that the method:

determines a waypoint (913) of the flight plan for the rejoining, defined as the first waypoint (913) of the flight plan included in a capture zone defined by the flight plan trajectory situated downstream of the point of intersection between the straight line defined by an angle ($\alpha$) with the perpendicular to the track of the aircraft and the trajectory of the flight plan, formulates the optimal lateral flight trajectory for a rejoining by the aircraft (200) at the determined waypoint.

Advantageously, the flight trajectory formulation method allows the application of speed and/or altitude constraints to the aircraft (200) taking into account speed and/or altitude constraints imposed along the trajectory of the flight plan (910).

19 Claims, 13 Drawing Sheets

METHOD OF SHORT-TERM REJOINING OF A FLIGHT PLAN BY RADAR GUIDANCE OF AN AIRCRAFT

CROSS-REFERENCE TO RELATED APPLICATIONS

This application claims priority to foreign France patent application No. 09 02364, filed on May 15, 2009, the disclosure of which is hereby incorporated by reference in its entirety.

BACKGROUND OF THE INVENTION

1. Technical Field of the Invention

The present invention relates to a method of short-term rejoining of a flight plan by radar guidance of an aircraft. It applies notably to the field of avionics, and more particularly to flight management devices usually designated according to the acronym FMS standing for the expression "Flight Management System".

2. Discussion on the Background

Most current aircraft possess a flight management system, for example of the FMS type, according to the acronym of the term "Flight Management System". These systems allow an aid to navigation, by displaying information useful to pilots, or else by communicating flight parameters to an automatic piloting system. Notably, a system of FMS type allows a pilot or some other qualified person, to enter, in pre-flight, a flight plan defined by a departure point, an arrival point, and a series of waypoints, usually designated by the abbreviation WPT. All these points can be chosen from among points predefined in a navigation database, and which correspond to airports, radionavigation beacons, etc. The points can also be defined by their geographical coordinates and their altitude. The entry of the waypoints can be done through a dedicated interface, for example a keyboard or a touchscreen, or else by transfer of data from an external device. A flight plan thus consists of a succession of segments, or "legs" according to the terminology usually employed in this technical field. Other data can be input into the flight management system, notably data relating to the aircraft's load plan and to the quantity of fuel on board. When the aircraft is in flight, the flight management system precisely evaluates the position of the aircraft and the uncertainty in this item of data, by centralizing the data originating from the various positioning devices, such as the satellite geo-positioning receiver, the radionavigation devices: for example DME, NDB and VOR, the inertial platform, etc. A screen allows the pilots to visualize the current position of the aircraft, as well as the track followed by it, and the closest waypoints, all on a map background making it possible to display other flight parameters and noteworthy points simultaneously. The information visualized allows notably the pilots to adjust flight parameters, such as heading, thrust, altitude, climb or descent rates, etc. or quite simply to monitor the proper progress of the flight if the aircraft is piloted automatically. The computer of the flight management system makes it possible to determine an optimal flight geometry, notably in the sense of a reduction in operating costs related to fuel consumption.

However, it frequently happens that an aircraft is constrained to leave the trajectory of a flight plan during the flight, for example following requests by the air traffic control bodies, either with the aim of circumventing an obstacle generated by unfavourable meteorological conditions, or simply with the objective of saving time or economizing on fuel consumption, etc. In such situations, it is necessary for the aircraft to rejoin the flight plan, from the instant at which the constraint no longer applies. Rejoining must take place in the most flexible possible manner, in terms of the aircraft's horizontal and vertical flight profiles, and speed profile; furthermore the choice of the waypoint to be rejoined must be relevant in this sense. It is furthermore desirable that the most realistic possible rejoining trajectory is determined, and taken into account by the FMS for the predictive calculations, notably of flight time and fuel consumption.

Moreover, as regards the guidance of the aircraft, two types of lateral navigation exist in current flight management systems. A first type of navigation is the controlled navigation mode or "NAV Mode" in which the flight of the aircraft is controlled by the FMS so as to follow the established lateral flight profile. A second type of lateral navigation is a mode of flight while holding a heading, or "HDG Mode" or else track mode or "TRK Mode". For this second type of lateral navigation mode, that is to say for the HDG or TRK mode, when the aircraft is proceeding outside of its flight plan, the FMS is based on simplistic assumptions for rejoining the trajectory of the flight plan. For example, the rejoining can be determined as a great circle to the last waypoint of the flight plan which has not been reached, or by an immediate return to the "active leg" of the flight plan. In reality, the rejoining of such a point may be unrealistic, for example because it forces the aircraft to turn back, or else because it imposes trajectories on it which are unachievable in practice, having regard to the performance of the aircraft, the safety of the flight or else the comfort of its passengers. The predictions being made while taking such trajectories into account are then erroneous.

As regards vertical navigation, the vertical flight plan can be followed in flight according to the profile of the FMS, in a totally controlled mode, or else in a particular mode, for example holding a vertical speed or a speed at constant thrust. In a particular mode such as this, the guidance function of the FMS which formulates the target speeds is simplified and no longer adapts the speed of the aircraft as a function of the speed constraints which may be associated with the waypoints of the flight plan. This limitation induces late and fierce changes of speed of the aircraft, which most of the time are counterbalanced manually by the pilot, who must then take over the controls and exit the automatic piloting mode. Such manoeuvres are made to the detriment of flight safety and comfort, and may have unfortunate repercussions on fuel consumption. Furthermore, such manoeuvres monopolize the pilot's workload.

It should also be observed that a corollary of better controlled trajectories and speed profiles is less load not only for the flight staff, but also for the staff of the air traffic control bodies.

SUMMARY OF THE INVENTION

An aim of the present invention is to alleviate the aforementioned drawbacks, by proposing a method of short-term rejoining of a flight plan by radar guidance of an aircraft plugging the gaps inherent in the current systems, assuming notably an immediate return to the active leg of a flight plan, and ignoring the speed and altitude constraints of the waypoints in particular flight modes.

An advantage of the invention is that it allows better anticipation of the navigation feedback along a flight plan, and a reduction in the workload required to guide the aircraft according to the vagaries of the trajectory constrained notably by the air traffic control bodies.

Another advantage of the invention is that it makes it possible to improve the calculation of the predictions regarding the main parameters taken into account by the FMS, such as flight time, fuel consumption, speed and altitude profiles, in the flight phases under radar guidance, by anticipating the rejoining of the flight plan at the most probable point.

For this purpose, the subject of the invention is a method of formulating a lateral flight trajectory for the rejoining by an aircraft of a trajectory of a flight plan comprising a plurality of waypoints, the aircraft flying outside of the flight plan and according to a divergent track with respect to the trajectory of the flight plan, characterized in that the method:
- determines a waypoint of the flight plan for the rejoining, defined as the first waypoint of the flight plan included in a capture zone defined by the flight plan trajectory situated downstream of the point of intersection between the straight line defined by an angle α with the perpendicular to the track of the aircraft and the trajectory of the flight plan,
- formulates the optimal lateral flight trajectory for a rejoining by the aircraft at the determined waypoint.

In an exemplary embodiment of the invention, the method of formulating a lateral flight trajectory can be characterized in that the capture zone is extended if no waypoint was able to be determined for the rejoining, an extended capture zone being defined by a decrease in the said angle α, by an angular value $\theta_{MAX}$ at most equal to the angle α, the method determining a waypoint for the rejoining, defined as the first waypoint included in the extended capture zone.

In an exemplary embodiment of the invention, the method of formulating a lateral flight trajectory can be characterized in that the capture zone is extended if a waypoint has been determined for the rejoining, but that the said waypoint is situated at a distance from the aircraft greater than a separation criterion, an extended capture zone being defined by a decrease in the said angle α, by an angular value $\theta_{MAX}$ at most equal to the angle α, the method determining a new waypoint for the rejoining, defined as the first waypoint included in the extended capture zone.

In an exemplary embodiment of the invention, the method of formulating a lateral flight trajectory can be characterized in that the said waypoint determined for the rejoining, or the said new waypoint determined, is ignored if it is separated from the aircraft by a distance greater than the separation criterion, or if it is separated from the aircraft by a distance less than a proximity criterion.

In an exemplary embodiment of the invention, the method of formulating a lateral flight trajectory can be characterized in that the said angle α has a predetermined value lying between 0° and 90°.

In an exemplary embodiment of the invention, the method of formulating a lateral flight trajectory can be characterized in that the said angle α has a predetermined value lying between 0° and 45°.

In an exemplary embodiment of the invention, the method of formulating a lateral flight trajectory can be characterized in that the said separation criterion is a predetermined distance.

In an exemplary embodiment of the invention, the method of formulating a lateral flight trajectory can be characterized in that the said proximity criterion is a predetermined distance.

In an exemplary embodiment of the invention, the method of formulating a lateral flight trajectory can be characterized in that the separation criterion corresponds to the distance travelled by the aircraft at its current speed for a determined duration.

In an exemplary embodiment of the invention, the method of formulating a lateral flight trajectory can be characterized in that the separation criterion has a value determined by the method as a function of parameters having an influence on the flight performance of the aircraft.

In an exemplary embodiment of the invention, the method of formulating a lateral flight trajectory can be characterized in that the proximity criterion corresponds to the distance travelled by the aircraft at its current speed for a determined duration.

In an exemplary embodiment of the invention, the method of formulating a lateral flight trajectory can be characterized in that the proximity criterion has a value determined by the method as a function of parameters having an influence on the flight performance of the aircraft.

In an exemplary embodiment of the invention, the method of formulating a lateral flight trajectory can be characterized in that the said angular value $\theta_{MAX}$ has a predetermined value.

In an exemplary embodiment of the invention, the method of formulating a lateral flight trajectory can be characterized in that the said angular value $\theta_{MAX}$ has a value determined by the method as a function of parameters having an influence on the flight performance of the aircraft.

In an exemplary embodiment of the invention, the method of formulating a lateral flight trajectory can be characterized in that it also determines a speed constraint to be applied to the aircraft equal to a speed constraint imposed at the level of the next waypoint of the flight plan situated downstream of the aircraft, at the level of which a speed constraint is imposed:
- if the aircraft is in the departure phase, and is situated inside a lateral track-deviation zone delimited by two maximum lateral trajectories parallel to the trajectory of the flight plan and situated at a determined distance on either side of the latter, and is situated upstream of a reference line passing through the said waypoint of the flight plan at the level of which a speed constraint is imposed;
- if the aircraft is in the arrival phase, and is situated inside the lateral track-deviation zone, and is situated downstream of the reference line.

In an exemplary embodiment of the invention, the method of formulating a lateral flight trajectory can be characterized in that it also determines an altitude constraint to be applied to the aircraft equal to an altitude constraint imposed at the level of the next waypoint of the flight plan situated downstream of the aircraft, at the level of which an altitude constraint is imposed, if the aircraft is situated inside the lateral track-deviation zone, and is situated upstream of a reference line passing through the said waypoint of the flight plan at the level of which an altitude constraint is imposed.

In an exemplary embodiment of the invention, the method of formulating a lateral flight trajectory can be characterized in that the reference line is defined as the bisector of the two segments of the flight plan situated respectively directly upstream and downstream of the waypoint at the level of which the speed and/or altitude constraint is imposed.

The subject of the present invention is also a flight management device for an aircraft of FMS type characterized in that it implements a method such as described above of formulating a lateral flight trajectory.

BRIEF DESCRIPTION OF THE FIGURES

Other characteristics and advantages of the invention will become apparent on reading the description, given by way of example and with regard to the appended drawings which represent.

DESCRIPTION OF THE PREFERRED EMBODIMENTS

Figure 1:
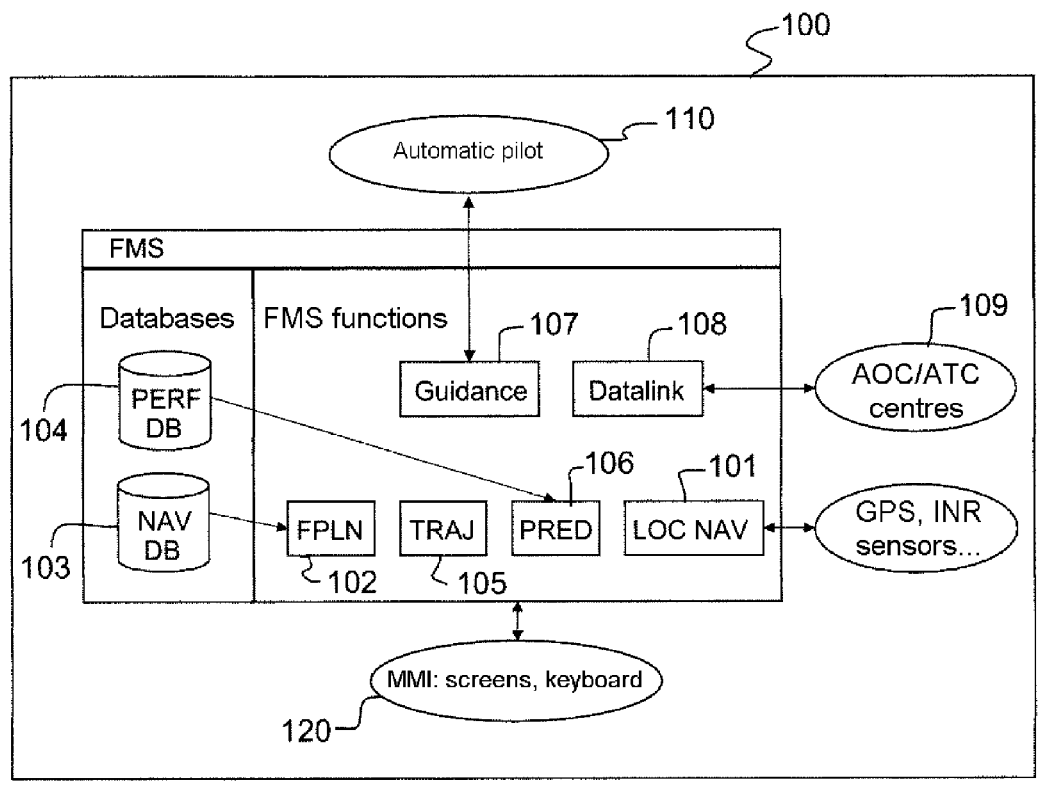
FIG. 1, by a summary diagram, the structure of a flight management system of FMS type, known from the prior art.

FIG. 1 presents a summary diagram illustrating the structure of a flight management system of FMS type, known from the prior art.

A system of FMS type 100 has a man-machine interface 120 comprising for example a keyboard and a display screen, or quite simply a tactile display screen, as well as at least the following functions, described in the aforementioned ARINC 702 standard:

Navigation (LOCNAV) 101, for performing optimal location of the aircraft as a function of the geo-location means 130 such as the satellite geo-positioning or GPS, GALILEO, the VHF radionavigation beacons, the inertial platforms. This module communicates with the aforementioned geo-location devices;

Flight plan (FPLN) 102, for entering the geographical elements constituting the skeleton of the track to be followed, such as the points imposed by the departure and arrival procedures, the waypoints, the air lanes (or airways);

Navigation database (NAVDB) 103, for constructing geographical routes and procedures on the basis of data included in the bases relating to the points, beacons, interception or altitude legs, etc;

Performance database, (PRFDB) 104, containing the craft's aerodynamic and engine parameters;

Lateral trajectory (TRAJ) 105, for constructing a continuous trajectory on the basis of the points of the flight plan, complying with the performance of the aircraft and the confinement constraints (RNP);

Predictions (PRED) 106, for constructing an optimized vertical profile on the lateral and vertical trajectory. The functions forming the subject of the present invention affect this part of the computer;

Guidance (GUID) 107, for guiding in the lateral and vertical planes the aircraft on its three-dimensional trajectory, while optimizing its speed. In an aircraft equipped with an automatic piloting device 110, the latter can exchange information with the guidance module 107;

Digital data link (DATALINK) 108 for communicating with the control centres and the other aircraft 109.

The flight plan is input by the pilot, or else by data link, on the basis of data contained in the navigation database. A flight plan typically consists of a succession of segments, usually designated by the name "legs", which are formed of a termination and of a geometry, for example a geometry of turning type, or else of straight line, great circle or rhumb line type. The various types of legs are defined in the ARINC 424 international standard.

The pilot then enters the aircraft's parameters: weight, flight plan, spread of cruising levels, as well as one or a plurality of optimization criteria, such as the CI. These inputs allow the modules TRAJ 105 and PRED 106 to calculate respectively the lateral trajectory and the vertical profile, that is to say the flight profile in terms of altitude and speed, which for example minimizes the optimization criterion.

The function of the present invention can be integrated into the modules FPLN 102, TRAJ 105 and PRED 106 of an FMS.

Figure 2:
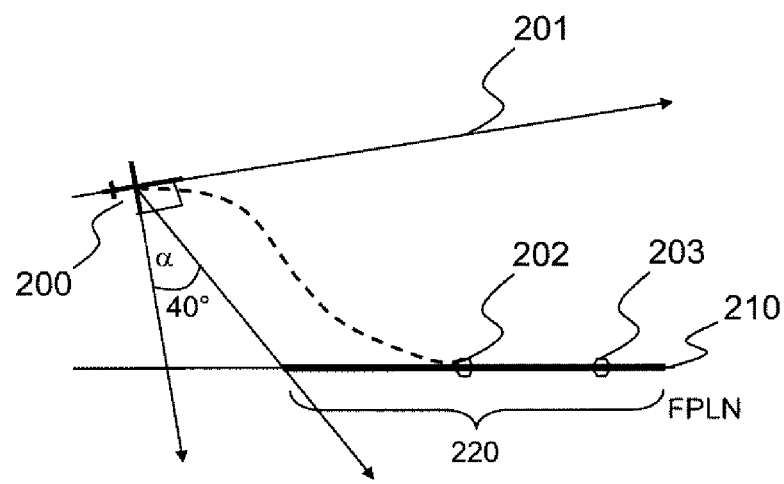
FIG. 2, viewed from above, the lateral flight profile of an aircraft for a first exemplary rejoining of a flight plan trajectory according to an embodiment of the invention.

FIG. 2 presents a view from above illustrating the lateral flight profile of an aircraft for a first exemplary rejoining of a flight plan trajectory according to an embodiment of the invention.

An aircraft 200 follows a track 201. The track 201 is divergent with respect to the trajectory of a flight plan 210 containing waypoints 202, 203. A capture zone 220 is defined as the zone in which the method according to an exemplary embodiment of the present invention searches for a waypoint of the flight plan which is a potential candidate for the rejoining by the aircraft 200 of the trajectory of the flight plan 210. An angle α, intermediate between the track of the aircraft and the perpendicular to this track, allows the definition of the capture zone 220. The angle α has a value lying between 0 and 90°. Advantageously, its value lies between 0 and 45°. For example the angle α can be defined as equal to 40° with respect to the axis perpendicular to the track of the aircraft 200 and pointing in the direction of the trajectory of the flight plan 210. The capture zone 220 can then be defined as the zone situated along the trajectory of the flight plan 210, downstream of the point of intersection between the direction given by the angle α and the trajectory of the flight plan 210, downstream of the position of the aircraft 200.

The method of rejoining the flight plan can search for the first waypoint situated in the capture zone 220, the rejoining waypoint 202 in the example of the figure, and formulate the lateral trajectory for rejoining this point, according to a lateral profile definition algorithm which is itself known from the prior art, for example such that the tangent to the trajectory of the aircraft 200 at the level of the point of rejoining the trajectory of the flight plan is aligned with the direction of the leg following the rejoining point, the radii of curvature of the trajectory being determined as a function of the geometry of the current trajectory of the aircraft, of the trajectory of the flight plan 210, and of various parameters such as the speed of the aircraft, its performance, etc.

Advantageously, a proximity criterion can be introduced, so as to ensure a flight trajectory that is achievable in practice. Indeed, when the first waypoint in the capture zone 220 is too close to the aircraft 200, for example less than 10 Nm from the latter, the flight geometry for rejoining may not be practicable or realistic. In such a case, the waypoint thus determined is ignored, and the method searches for another waypoint situated further downstream in the capture zone 220. The proximity criterion is dependent on the performance of the relevant aircraft 220.

Advantageously, it is possible to vary the proximity criterion as a function of diverse parameters having an influence on the flight performance of the aircraft 200, for example the laden weight, temperature, current speed of the aircraft, meteorological conditions, altitude, etc. It is also possible for the proximity criterion to correspond to the distance travelled by the aircraft 200 flying at its current speed, for a determined time. This determined time can for example typically be from one to two minutes.

Figure 3:
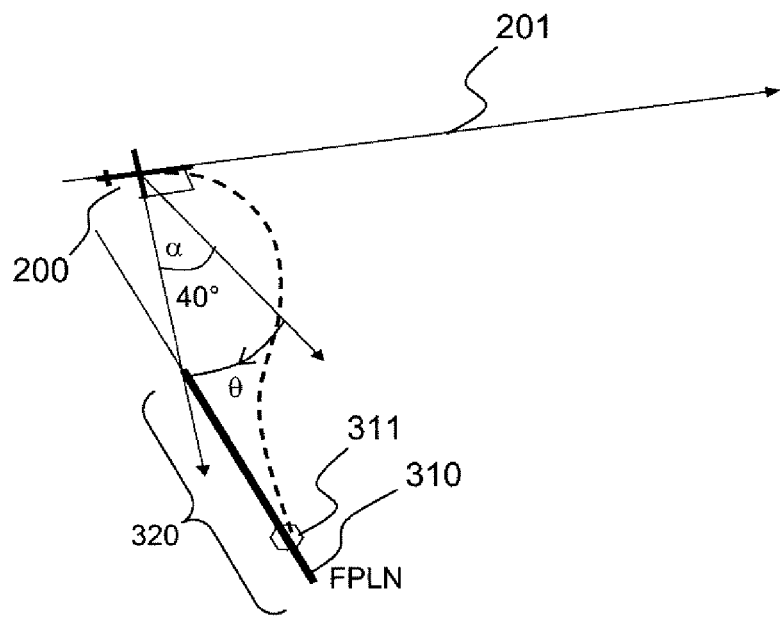
FIG. 3, viewed from above, the lateral flight profile of the aircraft for another exemplary rejoining of the flight plan trajectory with the extension of a capture zone, according to an embodiment of the invention.

FIG. 3 presents a view from above illustrating the lateral flight profile of the aircraft for another exemplary rejoining of the flight plan trajectory according to an embodiment of the invention.

In the example of the figure, the aircraft 200 following the track 201 must rejoin a trajectory of the flight plan 310. When the method such as described previously with reference to FIG. 2 does not succeed in finding a candidate waypoint for rejoining the trajectory of the flight plan 310, it is possible to undertake an extension of the capture zone so as to define an extended capture zone 320, upstream of the capture zone defined by the angle α, to an angle α-θ, θ being less than or equal to α. The cases where no candidate waypoint can be determined in the capture zone defined on the basis of the angle α typically correspond to the cases where the angle of divergence between the track 201 of the aircraft 200 and the trajectory of the flight plan 310 is greater than α. A candidate waypoint 311 can then be found in the extended capture zone 320. The method can for example undertake a scan of the angle θ, thus progressively extending the capture zone until a candidate waypoint is found, or else directly fix the maximum extended capture zone and undertake a search for waypoints in this extended capture zone. A criterion of minimum rejoining angle can be introduced by fixing a maximum value of the angle θ: $\theta_{max}$, short of which a found waypoint would not allow a trajectory of the aircraft which is achievable in practice. Also, it is possible to vary the rejoining angle criterion as a function of various parameters having an influence on the flight performance of the aircraft 200, for example the laden weight, temperature, current speed of the aircraft, meteorological conditions, altitude, etc.

Advantageously, it is possible to introduce a separation criterion. The method can then ignore a waypoint situated at a distance greater than a determined threshold from the aircraft. For example, this threshold can be situated at 40 Nm from the current position of the aircraft 200. In the same manner, it is possible to vary the separation criterion as a function of diverse parameters having an influence on the flight performance of the aircraft 200, for example the laden weight, temperature, current speed of the aircraft, meteorological conditions, altitude, etc. It is also possible for the separation criterion to correspond to the distance travelled by the aircraft 200 flying at its current speed, for a determined time. This determined time can for example typically be ten minutes.

Still advantageously, the method of rejoining the flight plan can define a capture zone 220 on the basis of the angle α, find a first waypoint of the flight plan in the capture zone 220, verify that the separation criterion is satisfied for this first waypoint, and then undertake an extension of the capture zone in the converse case, and thus search for a possible second waypoint downstream of the aircraft, but upstream of the first waypoint.

Figure 4:
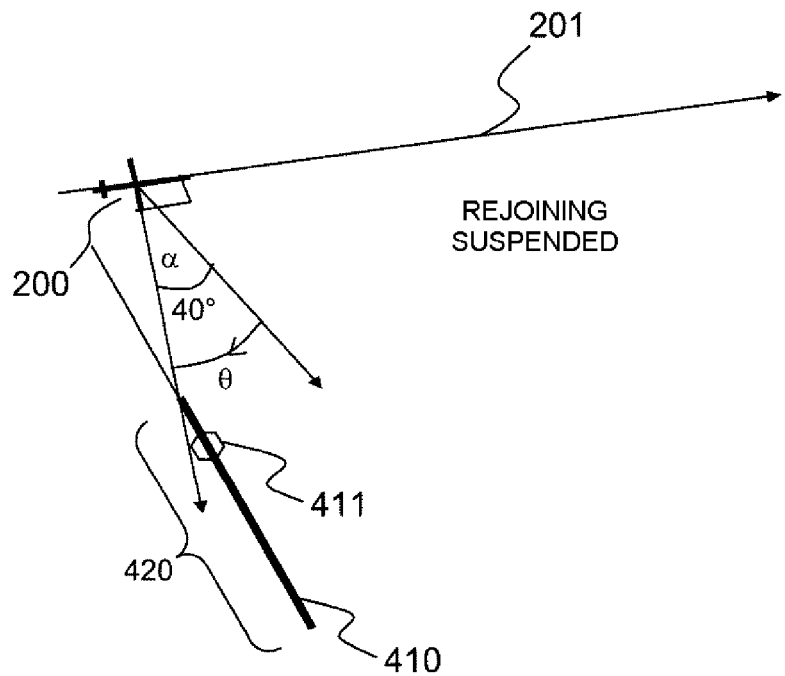
FIG. 4, viewed from above, the lateral flight profile of the aircraft for another exemplary rejoining of the flight plan trajectory with extension of the capture zone and application of a proximity criterion, according to an embodiment of the invention.

FIG. 4 presents a view from above illustrating the lateral flight profile of the aircraft for another exemplary rejoining of the flight plan trajectory with extension of the capture zone and application of a proximity criterion, according to an embodiment of the invention.

In the example of the figure, the method does not make it possible to find a waypoint in the capture zone defined on the basis of the angle α. A waypoint 411 can be found in a capture zone 420 along a flight plan trajectory 410; nonetheless the point does not satisfy the proximity criterion, being situated too close to the aircraft 200. In the case illustrated by this example, the method cannot determine any waypoint for rejoining the trajectory of the flight plan 410.

Figure 5:
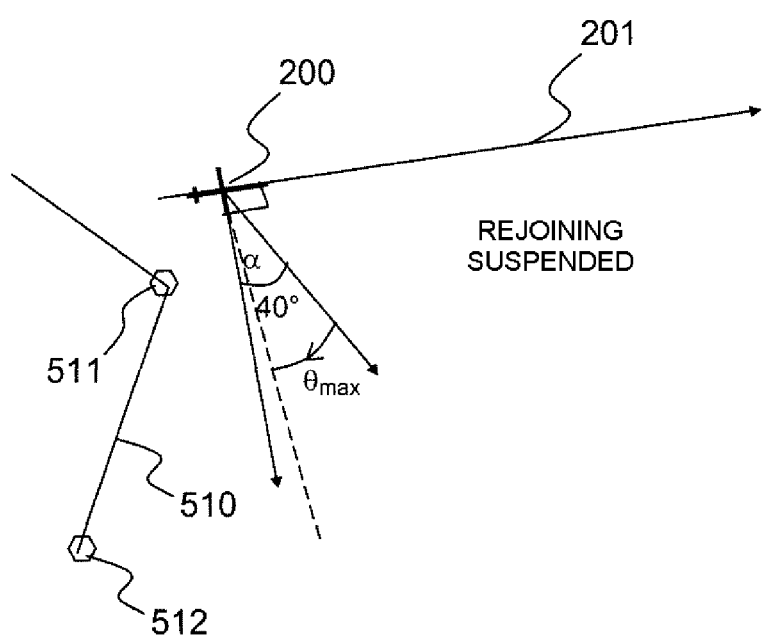
FIG. 5, viewed from above, the lateral flight profile of the aircraft for another example where no solution for rejoining the flight plan is proposed by the method according to the invention.

FIG. 5 presents a view from above illustrating the lateral flight profile of the aircraft for another example where no solution for rejoining the flight plan is proposed by the method according to the invention.

In the example of the figure, the aircraft 200 follows a track 201, and must rejoin a trajectory of a flight plan 510, comprising two waypoints 511 and 512. In this example, there is no intersection between the direction defined by the angle α and the trajectory of the flight plan 510, it is thus not possible to define a capture zone. Neither is it possible in this example to define an extended capture zone, since there is no intersection between $\alpha - \theta_{max}$ and the trajectory of the flight plan 510. In such a case the method according to the invention does not propose any waypoint for rejoining the flight plan.

Figure 6:
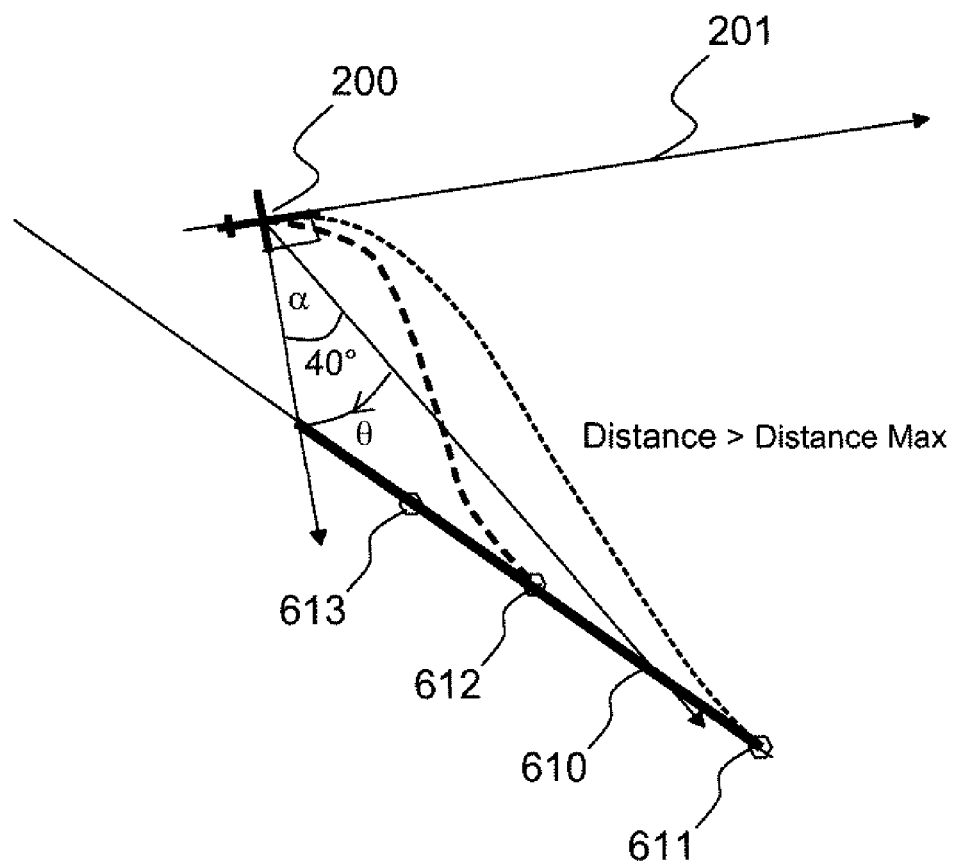
FIG. 6, viewed from above, the lateral flight profile of the aircraft for another exemplary rejoining of the flight plan with extension of the capture zone and application of the separation criterion.

FIG. 6 presents a view from above illustrating the lateral flight profile of the aircraft for another exemplary rejoining of the flight plan with extension of the capture zone and application of the separation criterion.

In the example illustrated by the figure, the aircraft 200 flies according to a divergent trajectory 201 with respect to the trajectory of the flight plan 610. A waypoint 611 can be found in the initial capture zone defined by the angle α, but the waypoint 611 may be too far from the aircraft 200, and consequently not be in accordance with the separation criterion. The capture zone can then be extended, and a second waypoint 612 can be found upstream of the first waypoint 611; nonetheless the second waypoint may not be in accordance with the separation criterion either. A third waypoint 613 upstream of the second waypoint 612 can be found. The third point 613 may be in accordance with the separation criterion, and chosen as point for rejoining the trajectory of the flight plan 610. In another example, the third point 613 may not be in accordance with the proximity criterion, through being too close to the aircraft 200. In the latter case, it is possible that the method according to an embodiment of the invention cannot then find any rejoining solution.

Figure 7:
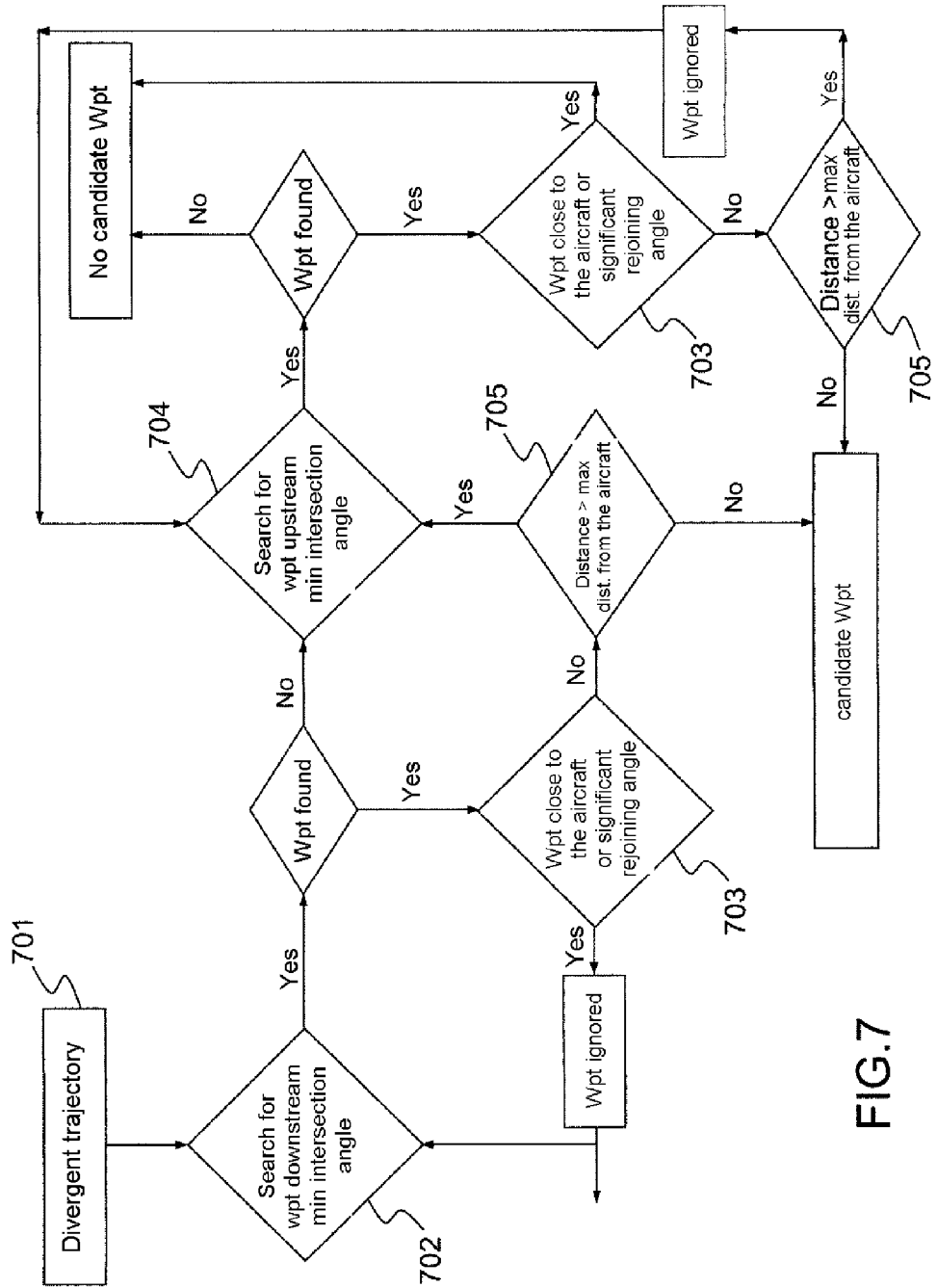
FIG. 7, a logic diagram illustrating an exemplary rejoining method according to an embodiment of the invention.

FIG. 7 presents a logic diagram illustrating an exemplary rejoining method according to an embodiment of the invention.

A step of initiation 701 of the method according to the invention is followed by a first step 702 of searching for a waypoint. The waypoint search performed in the first step 702 is carried out in the initial capture zone, that is to say defined along the trajectory situated downstream of the aircraft, and downstream of the point of intersection between the direction defined by the mean angle α and the trajectory of the flight plan. If a waypoint is found on completion of the first search step 702, then a first comparison step 703 for comparing the distance of the aircraft from the waypoint found on completion of the first search step 702 with respect to the proximity criterion is carried out; otherwise, that is to say if no waypoint has been found on completion of the first search step 702, then a second search step 704 is carried out. If in the first comparison step 703, the waypoint found turns out to be too close to the aircraft according to the proximity criterion, then the waypoint found is ignored, and a new first step 702 of searching for a waypoint is carried out. If in the first comparison step 703, the distance separating the aircraft from the waypoint found turns out to be reasonable according to the proximity criterion, then a second comparison step 705 for comparing the distance of the aircraft from the waypoint found on completion of the first search step 702 with respect to the separation criterion is carried out. The waypoint search performed in the second search step 704 is carried out in the extended capture zone, that is to say defined along the trajectory situated downstream of the aircraft, and for example downstream of the point of intersection between the direction defined by the mean angle $\alpha$-$\theta_{MAX}$ and the trajectory of the flight plan. If in the second comparison step 705, the distance separating the aircraft from the waypoint found on completion of the first search step 702 turns out to be too far according to the separation criterion, then a new second search step 704 is carried out. In the converse case, if in the second comparison step 705, the distance separating the aircraft from the waypoint found on completion of the first search step 702 turns out to be reasonable according to the separation criterion, then the waypoint found on completion of the first search step 702 is declared as candidate waypoint for the rejoining of the trajectory of the flight plan by the aircraft.

If on completion of the second search step 704, no waypoint can be found, then the method does not determine any waypoint for a rejoining by the aircraft of the trajectory of the flight plan. If a waypoint is found on completion of the second search step 704, then the first comparison step 703 for comparing the distance of the aircraft from the waypoint found on completion of the second search step 704 with respect to the proximity criterion is carried out. If in the first comparison step 703, the waypoint found on completion of the second search step 704 turns out to be too close to the aircraft according to the proximity criterion, then the method has not been able to determine any waypoint for the rejoining of the trajectory of the flight plan by the aircraft. If on the other hand, the distance separating the aircraft from the waypoint found turns out to be reasonable according to the proximity criterion, then the second comparison step 705 for comparing the distance of the aircraft from the waypoint found on completion of the second search step 704 with respect to the separation criterion is carried out. If in the second comparison step 705, the distance separating the aircraft from the waypoint found on completion of the second search step 704 turns out to be too far according to the separation criterion, then a new second search step 704 is carried out. In the converse case, if in the second comparison step 705, the distance separating the aircraft from the waypoint found on completion of the second search step 704 turns out to be reasonable according to the separation criterion, then the waypoint found on completion of the second search step 704 is declared as candidate waypoint for the rejoining of the trajectory of the flight plan by the aircraft.

The cases where the trajectory of the aircraft is convergent with respect to the trajectory of the flight plan are not developed above. In these cases, it is indeed possible to define the candidate waypoint for the rejoining of the flight plan by the aircraft as the first waypoint situated downstream of the point of intersection between the main axis of the aircraft and the trajectory of the flight plan. It is also possible to envisage a rejoining of the aircraft at a point of the trajectory of the flight plan which is not one of the waypoints, but a point upstream of the aforementioned first waypoint, as is possible by employing certain rejoining algorithms known from the prior art.

Figure 8:
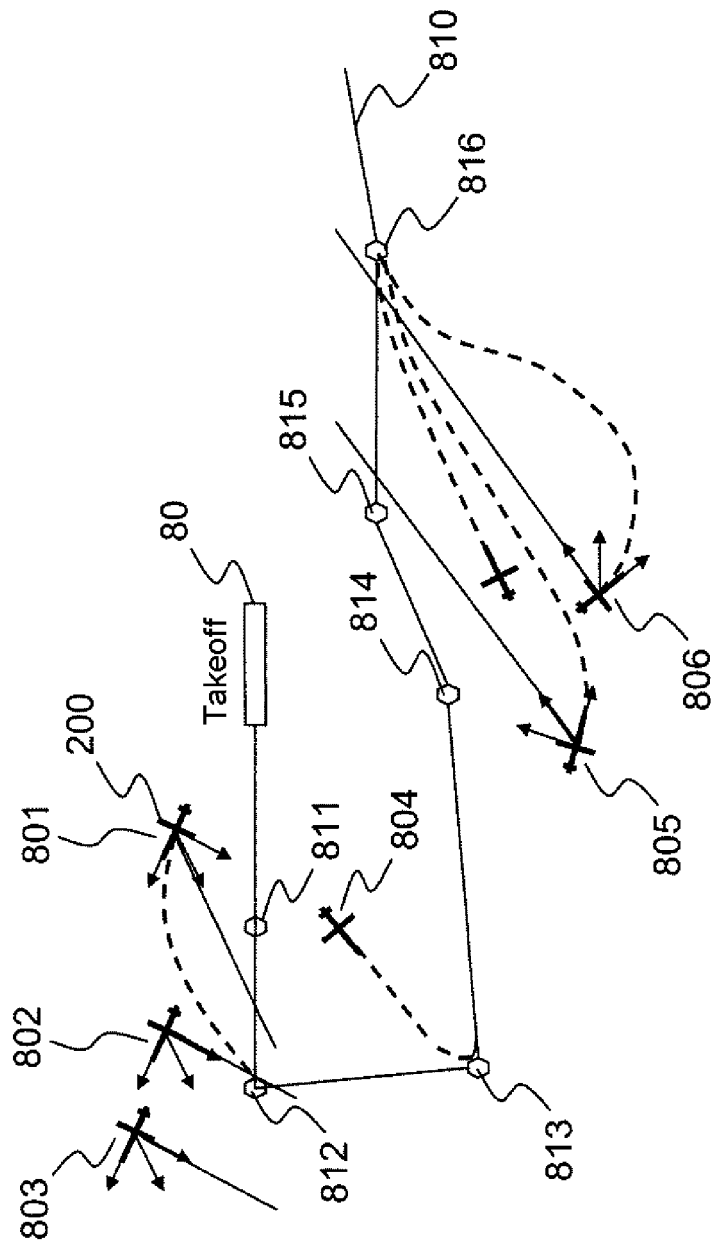
FIG. 8, viewed from above, the lateral flight profile of the aircraft for various examples of positions with respect to a first exemplary flight plan trajectory for a departure procedure.

FIG. 8 presents a view from above illustrating the lateral flight profile of the aircraft for various examples of positions and of directions of flight with respect to an exemplary flight plan trajectory for a departure procedure.

Various examples of positions 801 to 806 of the aircraft 200 after a takeoff from a runway 80 allow a better understanding of the rejoining method according to the embodiment of the invention described above with reference to the previous figures. A series of waypoints 811 to 816 defines a flight plan trajectory 810.

For a first position 801 of the aircraft 200 whose flight follows a divergent trajectory from the trajectory of the flight plan 810, the direction defined by the mean angle α cuts the trajectory of the flight plan 810 at an intersection point. The second waypoint 812 is found along the trajectory, downstream of the intersection point. In this example, the distance between the aircraft 200 and the second waypoint 812 is larger than the proximity criterion, according to the result of the first comparison step 703 with reference to FIG. 7. Moreover, this distance is less than the separation criterion, according to the result of the second comparison step 705. Thus the second waypoint 812 is declared candidate for the rejoining, and the FMS calculates an optimal rejoining trajectory via this point.

For a second position 802 of the aircraft 200 whose flight follows a divergent trajectory with respect to the trajectory of the flight plan 810, the direction defined by the mean angle α does not cut the trajectory of the flight plan 810. Thus a search for a waypoint in an extended capture zone is carried out along the trajectory of the flight plan 810, and downstream of the point of intersection between the direction defined by the angle $\alpha$-$\theta_{MAX}$ and the trajectory of the flight plan 810. $\theta_{MAX}$ can in this example be chosen equal to α. The second waypoint 812 is then found. However, the distance between the aircraft 200 and the second waypoint 812 is less than the proximity criterion, according to the result of the first comparison step 703 with reference to FIG. 7. Thus, no candidate waypoint for the rejoining of the trajectory of the flight plan 810 by the aircraft 200 is found by the method.

For a third position 803 of the aircraft 200 whose flight follows a divergent trajectory with respect to the trajectory of the flight plan 810, the direction defined by the mean angle α does not cut the trajectory of the flight plan 810. In this example, the direction defined by the angle $\alpha$-$\theta_{MAX}$ does not cut the trajectory of the flight plan 810 either. Thus no candidate waypoint for the rejoining by the aircraft of the trajectory of the flight plan 810 is found by the method.

For a fourth position 804 of the aircraft 200 whose flight follows a convergent trajectory with respect to the trajectory of the flight plan 810, the third waypoint 813 is chosen as candidate for the rejoining of the trajectory of the flight plan 810 by the aircraft. Indeed, this point is situated just downstream of the point of intersection between the direction given by the current trajectory of the aircraft 200 and the trajectory of the flight plan 810. The module TRAJ 105, with reference to FIG. 1, of the FMS 100 can then determine a rejoining point slightly downstream of the third waypoint 813, and along the following leg, so as to comply with the feasibility of the flight as a function of the performance of the aircraft 200.

For a fifth position 805 of the aircraft 200 whose flight follows a divergent trajectory with respect to the trajectory of the flight plan 810, the direction defined by the mean angle α cuts the trajectory of the flight plan 810 at an intersection point. The sixth waypoint 816 is found along the trajectory, downstream of the intersection point. In this example, the distance between the aircraft 200 and the sixth waypoint 816 is larger than the proximity criterion, according to the result of the first comparison step 703 with reference to FIG. 7. Moreover, this distance is less than the separation criterion, according to the result of the second comparison step 705. Thus the sixth waypoint 816 is declared candidate for the rejoining, and the FMS calculates an optimal rejoining trajectory via this point.

For a sixth position 806 of the aircraft 200 whose flight follows a divergent trajectory with respect to the trajectory of the flight plan 810, the direction defined by the mean angle α does not cut the trajectory of the flight plan 810. Thus a search for a waypoint in an extended capture zone is carried out along the trajectory of the flight plan 810, and downstream of the point of intersection between the direction defined by the angle $\alpha - \theta_{MAX}$ and the trajectory of the flight plan 810. $\theta_{MAX}$ can in this example be chosen equal to α. The sixth waypoint 816 is then found. In this example, the distance between the aircraft 200 and the sixth waypoint 816 is larger than the proximity criterion, according to the result of the first comparison step 703 with reference to FIG. 7. Moreover, this distance is less than the separation criterion, according to the result of the second comparison step 705. Thus the sixth waypoint 816 is declared candidate for the rejoining, and the FMS calculates an optimal rejoining trajectory via this point.

Figure 9:
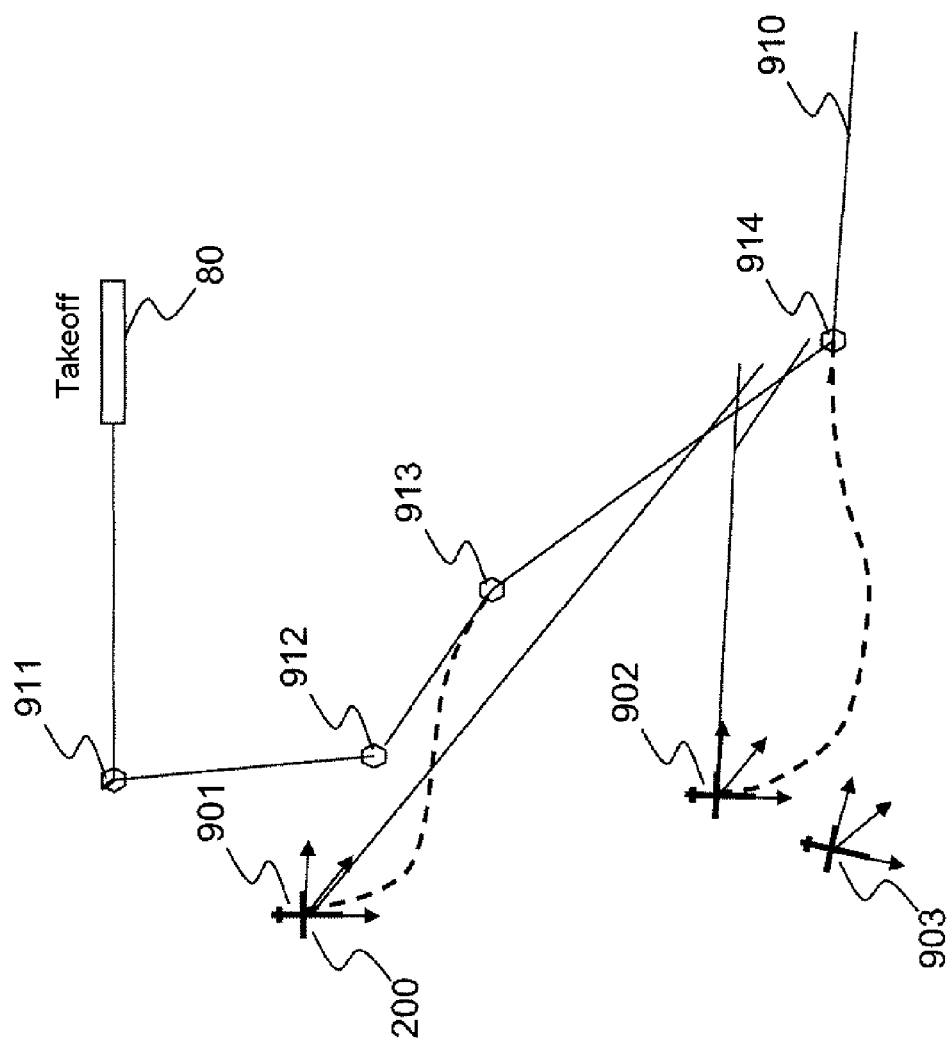
FIG. 9, viewed from above, the lateral flight profile of the aircraft for various examples of positions with respect to another exemplary flight plan trajectory for a departure procedure.

FIG. 9 presents a view from above illustrating the lateral flight profile of the aircraft for various examples of positions with respect to another exemplary flight plan trajectory for a departure procedure.

Various examples of positions 901 to 903 of the aircraft 200 after a takeoff from a runway 80 allow a better understanding of the rejoining method according to the embodiment of the invention described above with reference to the previous figures. A series of waypoints 911 to 914 defines a flight plan trajectory 910.

For a first position 901 of the aircraft 200 whose flight follows a divergent trajectory with respect to the trajectory of the flight plan 910, the direction defined by the mean angle α cuts the trajectory of the flight plan 910 at an intersection point. The fourth waypoint 914 is found along the trajectory, downstream of the intersection point. However, the distance between the aircraft 200 and the fourth waypoint is too large with regard to the separation criterion, according to the result of the second comparison step 705, with reference to FIG. 7. Thus the fourth waypoint 914 is ignored, and a search for a waypoint in an extended capture zone is carried out along the trajectory of the flight plan 910, and downstream of the point of intersection between the direction defined by the angle $\alpha - \theta_{MAX}$ and the trajectory of the flight plan 910. $\theta_{MAX}$ can in this example be chosen equal to α. The third waypoint 913 is then found. In this example, the distance between the aircraft 200 and the third waypoint 913 is larger than the proximity criterion, according to the result of the first comparison step 703 with reference to FIG. 7. Moreover, this distance is less than the separation criterion, according to the result of the second comparison step 705. Thus the third waypoint 913 is declared candidate for the rejoining, and the FMS calculates an optimal rejoining trajectory via this point.

For a second position 902 of the aircraft 200 whose flight follows a divergent trajectory with respect to the trajectory of the flight plan 910, the direction defined by the mean angle α does not cut the trajectory of the flight plan 910. Thus a search for a waypoint in an extended capture zone is carried out along the trajectory of the flight plan 910, and downstream of the point of intersection between the direction defined by the angle $\alpha - \theta_{MAX}$ and the trajectory of the flight plan 810. $\theta_{MAX}$ can in this example be chosen equal to α. The fourth waypoint 914 is then found. In this example, the distance between the aircraft 200 and the fourth waypoint 914 is larger than the proximity criterion, according to the result of the first comparison step 703 with reference to FIG. 7. Moreover, this distance is less than the separation criterion, according to the result of the second comparison step 705. Thus the fourth waypoint 914 is declared candidate for the rejoining, and the FMS calculates an optimal rejoining trajectory via this point.

For a third position 903 of the aircraft 200 whose flight follows a divergent trajectory with respect to the trajectory of the flight plan 910, the direction defined by the mean angle α does not cut the trajectory of the flight plan 910. In this example, the direction defined by the angle $\alpha - \theta_{MAX}$ does not cut the trajectory of the flight plan 910 either. Thus no candidate waypoint for the rejoining by the aircraft of the trajectory of the flight plan 910 is found by the method.

In an embodiment of the invention, there is proposed a trajectory rejoining method taking speed constraints into account. Indeed, speed constraints can be applied for passing particular waypoints, for example on request of the air traffic control bodies. This embodiment of the invention is illustrated in accordance with examples corresponding respectively to takeoff and landing phases, by FIGS. 10 and 11. FIGS. 12a and 12b present summary logic diagrams of the method.

Figure 10:
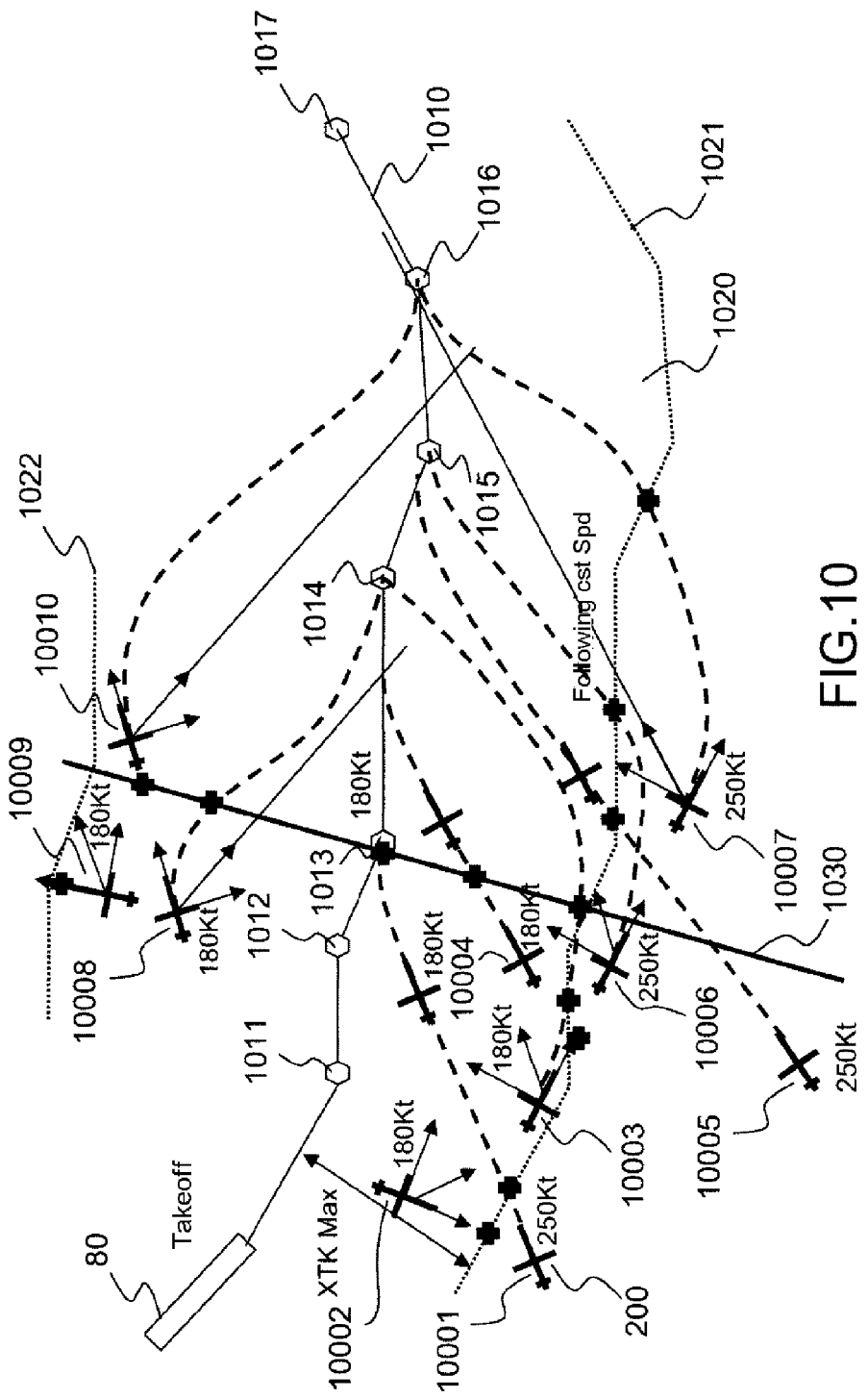
FIG. 10, viewed from above, the lateral flight profile of the aircraft and its speed for various examples of positions with respect to an exemplary flight plan trajectory for a departure procedure.

FIG. 10 presents a view from above illustrating the lateral flight profile of the aircraft and its speed for various examples of positions with respect to an exemplary flight plan trajectory for a departure procedure.

Various examples of positions 10001 to 10010 of the aircraft 200 flying at various speeds and following various trajectories, after a takeoff from a runway 80, allow a better understanding of the rejoining method according to an embodiment of the invention. A series of waypoints 1011 to 1017 defines a flight plan trajectory 1010.

A lateral track-deviation zone 1020 is defined on the basis of the trajectory of the flight plan 1010, such a zone is commonly designated XTK according to the acronym standing for the expression "Cross Track", usually used in the field of aeronautics. The lateral track-deviation zone 1020 is delimited by two maximum lateral trajectories 1021 and 1022, parallel to the trajectory of the flight plan 1010, for example at a distance of 25 Nm. In the example of FIG. 10, a maximum speed constraint of 180 Kts is imposed at the level of the third waypoint 1013. A reference line 1030 can be defined as the bisector formed at the third waypoint 1013, between the leg preceding and the leg following this waypoint.

In an exemplary embodiment of the invention, for the aircraft 200 proceeding in the airspace after takeoff from the runway 80, it is firstly appropriate to take into account the position of the aircraft 200 with respect to the lateral track-deviation zone 1020. If the aircraft 200 is situated outside of the lateral track-deviation zone 1020, then no speed constraint is applied to it. In the case where the aircraft 200 is situated in the lateral track-deviation zone 1020 or enters the latter, it is then appropriate to consider the position of the aircraft 200 with respect to the reference line 1030. The speed constraint applied to the aircraft 200 is then the speed constraint of the third waypoint 1013 if the aircraft is proceeding upstream of the reference line 1030. If the aircraft is situated downstream of the reference line 1030, then the speed constraint applied to the aircraft 200 is the following speed constraint, for example imposed at the level of a following waypoint along the trajectory of the flight plan 1010, or else the speed constraint imposed by a regulated zone. The method remains the same whatever the current trajectory of the aircraft 200, be it convergent or divergent with respect to the trajectory of the flight plan 1010, and whether the mode of navigation is an HDG or NAV mode.

For a first position 10001, the aircraft 200 is following a convergent trajectory with respect to the trajectory of the flight plan 1010, and is situated outside of the lateral track-deviation zone 1020, and upstream of the reference line 1030. A rejoining trajectory has been determined by the rejoining method such as described previously. The third waypoint 1013 has been determined for the rejoining, and an optimal lateral profile has been determined by the FMS. In the example of the figure, the speed of the aircraft at the first position 10001 is 250 Kts. When the aircraft 200 is proceeding outside of the lateral track-deviation zone 1020, no speed constraint is applied to it. As soon as the aircraft reaches the first maximum lateral trajectory 1021, it is the speed constraint of 180 Kts, imposed at the level of the third waypoint 1013, which is imposed on it, given that the aircraft 200 is then still situated upstream of the reference line 1030. This speed constraint is applied to it until it reaches the third waypoint 1013 so as to rejoin the trajectory of the flight plan 1010.

For a second position 10002, the aircraft 200 is following a divergent trajectory with respect to the trajectory of the flight plan 1010, and is situated in the lateral track-deviation zone 1020, and upstream of the reference line 1030. In this example, the rejoining method was unable to determine any rejoining trajectory. The speed constraint applied for the aircraft 200 is then the constraint applied at the level of the third waypoint 1013, as long as the aircraft is proceeding inside the lateral track-deviation zone 1020. As soon as the aircraft 200 reaches the first maximum lateral trajectory 1021, no speed constraint is then applied.

For a third position 10003, the aircraft 200 is following a divergent trajectory with respect to the trajectory of the flight plan 1010, and is situated in the lateral track-deviation zone 1020, and upstream of the reference line 1030. In this example, an optimal lateral flight profile has been determined for a rejoining of the trajectory of the flight plan 1010 via the fourth waypoint 1014. The flight trajectory stemming therefrom forces the aircraft to leave the lateral track-deviation zone 1020, and then to enter it again. Initially, as long as the aircraft 200 is proceeding inside the lateral track-deviation zone 1020, the speed constraint which is applied to it is that which is imposed at the level of the third waypoint 1013. When the aircraft reaches the first maximum lateral trajectory 1021, and leaves the lateral track-deviation zone 1020, no speed constraint is imposed on the aircraft 200. On the other hand, as soon as the latter re-enters the lateral track-deviation zone 1020, the speed constraint imposed at the level of the third waypoint 1013 is applied to it again. This speed constraint is applied until the aircraft crosses the reference line 1030. Henceforth, no particular speed constraint is applied to it.

For a fourth position 10004, the aircraft 200 is following a convergent trajectory with respect to the trajectory of the flight plan 1010, and is situated in the lateral track-deviation zone 1020, and upstream of the reference line 1030. In this example, a point for rejoining the trajectory of the flight plan 1010 has been determined by an existing trajectory rejoining method, upstream of the fourth waypoint 1014. The speed constraint applied to the aircraft 200 is the constraint imposed at the level of the third waypoint 1013, until the aircraft 200 reaches the reference line 1030. Henceforth, no speed constraint is applied to the aircraft 200, even if the latter is still proceeding within the lateral track-deviation zone 1020.

For a fifth position 10005, the aircraft 200 is following a convergent trajectory with respect to the trajectory of the flight plan 1010, and is situated outside of the lateral track-deviation zone 1020, and upstream of the reference line 1030. In this example, an optimal lateral flight profile has been determined for a rejoining of the trajectory of the flight plan 1010 via the fifth waypoint 1015. Initially, no speed constraint is applied to the aircraft 200, since the latter is proceeding outside of the lateral track-deviation zone 1020. When the aircraft 200 reaches the first maximum trajectory 1021, no speed constraint is applied to it either, since it is then situated downstream of the reference line 1030.

For a sixth position 10006, the aircraft 200 is following a divergent trajectory with respect to the trajectory of the flight plan 1010, and is situated outside of the lateral track-deviation zone 1020, and upstream of the reference line 1030. In this example, an optimal lateral flight profile has been determined for a rejoining of the trajectory of the flight plan 1010 via the fifth waypoint 1015. Initially, no speed constraint is applied to the aircraft 200, since the latter is proceeding outside of the lateral track-deviation zone 1020. When the aircraft 200 reaches the first maximum trajectory 1021, no speed constraint is applied to it either, since it is then situated downstream of the reference line 1030.

For a seventh position 10007, the aircraft 200 is following a divergent trajectory with respect to the trajectory of the flight plan 1010, and is situated outside of the lateral track-deviation zone 1020, and downstream of the reference line 1030. In this example, an optimal lateral flight profile has been determined for a rejoining of the trajectory of the flight plan 1010 via the sixth waypoint 1016. Initially, no speed constraint is applied to the aircraft 200, since the latter is proceeding outside of the lateral track-deviation zone 1020. When the aircraft 200 reaches the first maximum trajectory 1021, no speed constraint is applied to it either, since it is then situated downstream of the reference line 1030.

For an eighth position 10008, the aircraft 200 is following a divergent trajectory with respect to the trajectory of the flight plan 1010, and is situated in the lateral track-deviation zone 1020, and upstream of the reference line 1030. In this example, the speed constraint imposed at the level of the third waypoint 1013 is initially applied to the aircraft 200, the latter being situated in the lateral track-deviation zone 1020, and downstream of the reference line 1030. As soon as the aircraft 200 reaches the reference line 1030, no particular speed constraint is applied to it.

For a ninth position 10009, the aircraft 200 is following a divergent trajectory with respect to the trajectory of the flight plan 1010, and is situated in the lateral track-deviation zone 1020, and upstream of the reference line 1030. In this example, the rejoining method was unable to determine any rejoining trajectory. The speed constraint applied for the aircraft 200 is then the constraint applied at the level of the third waypoint 1013, as long as the aircraft is proceeding inside the lateral track-deviation zone 1020. As soon as the aircraft 200 reaches the second maximum lateral trajectory 1022, no speed constraint is then applied.

For a tenth position 10010, the aircraft 200 is following a divergent trajectory with respect to the trajectory of the flight plan 1010, and is situated in the lateral track-deviation zone 1020, and downstream of the reference line 1030. In this example, no particular speed constraint is applied to the aircraft 200, since the latter is proceeding downstream of the reference zone 1030.

Figure 11:
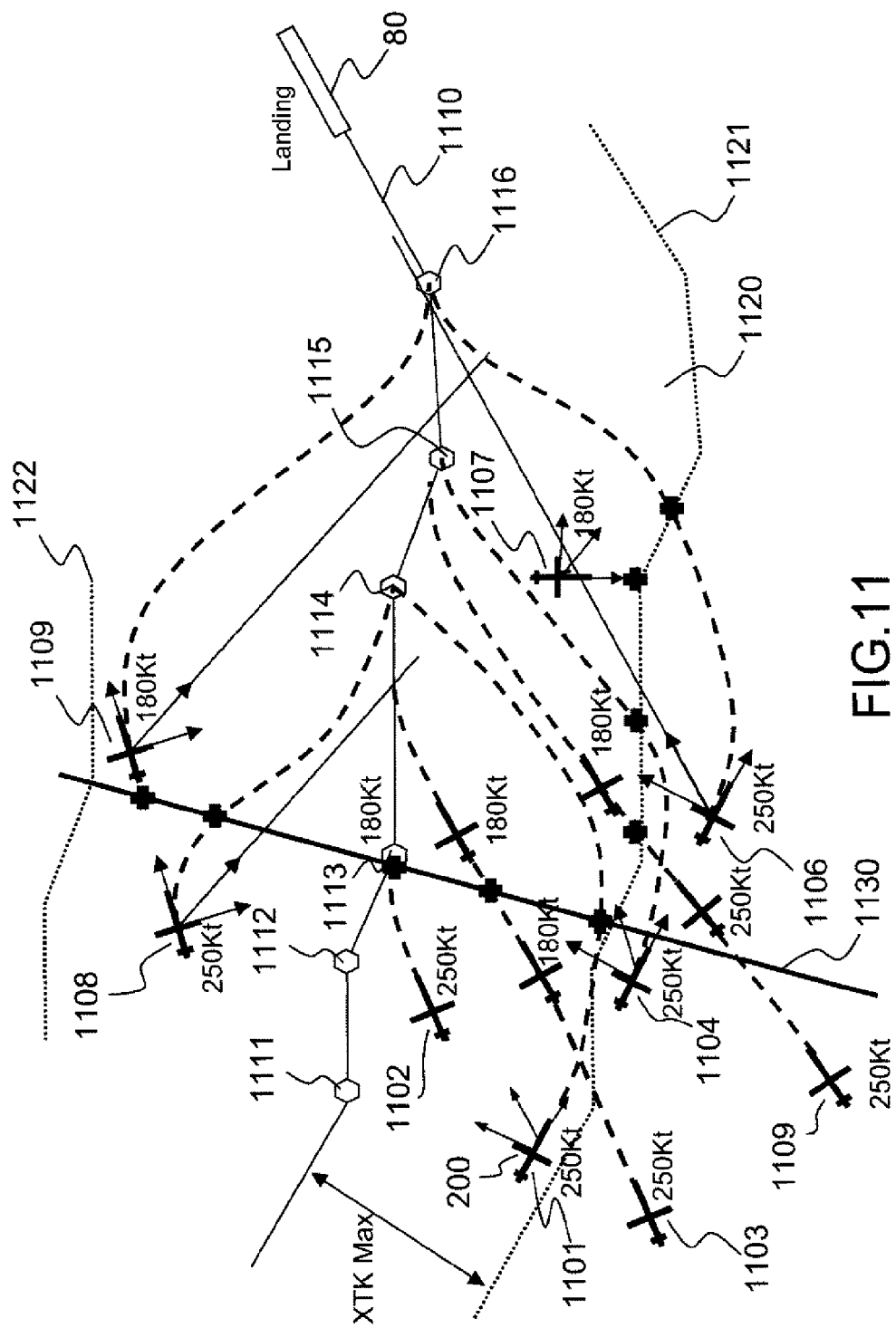
FIG. 11, viewed from above, the lateral flight profile of the aircraft and its speed for various examples of positions with respect to an exemplary flight plan trajectory for an arrival procedure.
Figure 12A:
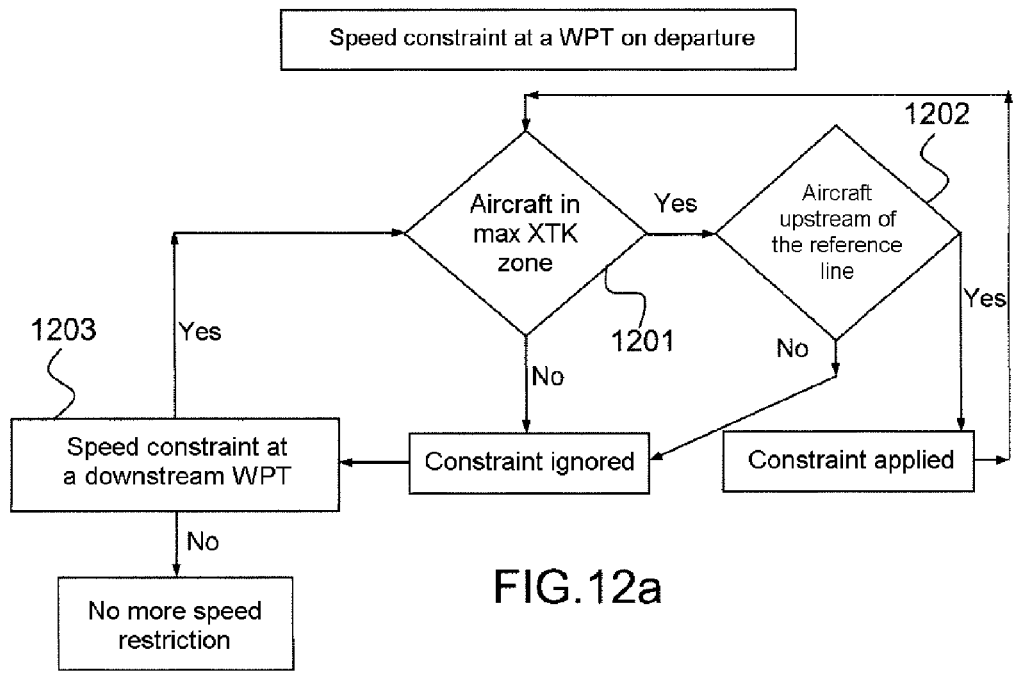
FIGS. 12a and 12b, logic diagrams illustrating an exemplary rejoining method with application of speed constraints, respectively for a departure procedure and an arrival procedure, according to an embodiment of the invention.
Figure 12B:
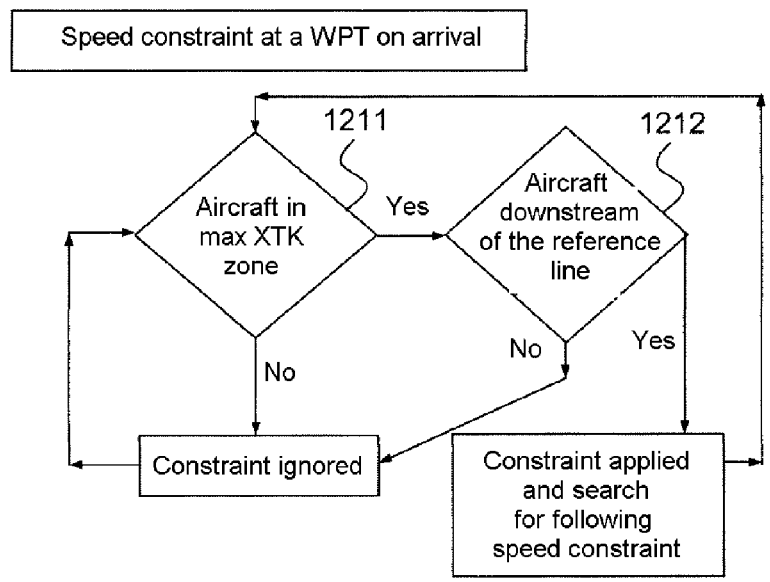

FIG. 11 presents a view from above illustrating the lateral flight profile of the aircraft and its speed for various examples of positions with respect to an exemplary flight plan trajectory for an arrival procedure.

Various examples of positions 1101 to 1109 of the aircraft 200, flying at various speeds and following various trajectories until landing on a runway 80, allow a better understanding of the rejoining method according to an embodiment of the invention. A series of waypoints 1111 to 1016 defines a flight plan trajectory 1110.

A lateral track-deviation zone 1120 is defined on the basis of the trajectory of the flight plan 1110. The lateral track-deviation zone 1120 is delimited by two maximum lateral trajectories 1121 and 1122, parallel to the trajectory of the flight plan 1110, for example at a distance of 25 Nm. In the example of FIG. 11, a maximum speed constraint of 180 Kts is imposed at the level of the third waypoint 1113. A reference line 1130 can be defined as the bisector formed at the third waypoint 1113, between the leg preceding and the leg following this waypoint.

In an exemplary embodiment of the invention, for the aircraft 200 proceeding in the airspace until landing on the runway 80, it is firstly appropriate to take into account the position of the aircraft 200 with respect to the lateral track-deviation zone 1120. If the aircraft 200 is situated outside of the lateral track-deviation zone 1120, then no speed constraint is applied to it. In the case where the aircraft 200 is situated in the lateral track-deviation zone 1120 or enters the latter, it is then appropriate to consider the position of the aircraft 200 with respect to the reference line 1130. The speed constraint applied to the aircraft 200 is then the speed constraint of the third waypoint 1013 if the aircraft is proceeding downstream of the reference line 1130. If the aircraft is situated upstream of the reference line 1130, then the speed constraint applied to the aircraft 200 is the following speed constraint, for example imposed at the level of a following waypoint along the trajectory of the flight plan 1010, or else the speed constraint imposed by a regulated zone. The method remains the same whatever the current trajectory of the aircraft 200, be it convergent or divergent with respect to the trajectory of the flight plan 1110, and whether the mode of navigation is an HDG or NAV mode.

For a first position 1101, the aircraft 200 is following a divergent trajectory with respect to the trajectory of the flight plan 1110, and is situated in the lateral track-deviation zone 1120, and upstream of the reference line 1130. A rejoining trajectory has been determined by the rejoining method such as described previously. The fourth waypoint 1114 has been determined for the rejoining, and an optimal lateral profile has been determined by the FMS. In the example of the figure, the speed of the aircraft at the first position 1101 is 250 Kts. Initially, no particular speed constraint is applied to the aircraft 200, until the latter reaches the reference line 1130. Henceforth, the speed constraint imposed at the level of the third waypoint 1113 is applied to the aircraft 200, the latter being situated downstream of the reference line 1130. This speed constraint is then applied to it until the landing procedure.

For a second position 1102, the aircraft 200 is following a convergent trajectory with respect to the trajectory of the flight plan 1110, and is situated in the lateral track-deviation zone 1120, and upstream of the reference line 1130. In this example, a rejoining trajectory has been determined by the rejoining method according to the invention, or by a known rejoining method. The waypoint designated for the rejoining is the third waypoint 1113. A proximity criterion can advantageously be introduced, so as to apply the speed constraint in an anticipated manner, when the point of change of the speed constraint to be applied to the aircraft 200 is situated in too close proximity to the point at the level of which the speed constraint is imposed. Thus, in this example, the speed constraint imposed at the level of the third waypoint 1113 can be applied to the aircraft before the latter reaches the reference line 1130 at the level of the third waypoint 1130.

For a third position 1103, the aircraft 200 is following a convergent trajectory with respect to the trajectory of the flight plan 1110, and is situated outside of the lateral track-deviation zone 1120, and upstream of the reference line 1130. In this example, a rejoining trajectory has been determined by a known rejoining method, at a point of the trajectory of the flight plan 1110 situated upstream of the fourth waypoint 1114. Initially, no speed constraint is applied to the aircraft 200. When the latter enters the lateral track-deviation zone 1120, no speed constraint is applied to it either, as long as it is proceeding upstream of the reference line 1130. As soon as the aircraft 200 crosses the reference line 1130, the speed constraint imposed at the level of the third waypoint 1113 is applied to it.

For a fourth position 1104, the aircraft 200 is following a divergent trajectory with respect to the trajectory of the flight plan 1110, and is situated outside of the lateral track-deviation zone 1120, and upstream of the reference line 1130. In this example, a rejoining trajectory has been determined by the rejoining method according to the invention, and the waypoint designated for the rejoining is the fifth waypoint 1115. Initially, the aircraft 200 is proceeding outside of the lateral track-deviation zone 1120, and upstream of the reference line 1130. No particular speed constraint is applied to it. Neither is any speed constraint applied to it when it crosses the reference line 1130, the aircraft still proceeding outside of the lateral track-deviation zone 1120. As soon as the aircraft 200 crosses the first maximum lateral trajectory 1121, then the speed constraint imposed at the level of the third waypoint 1113 is applied to it.

For a fifth position 1105, the aircraft 200 is following a convergent trajectory with respect to the trajectory of the flight plan 1110, and is situated outside of the lateral track-deviation zone 1120, and upstream of the reference line 1130. In this example, a rejoining trajectory has been determined by the rejoining method according to the invention, and the waypoint designated for the rejoining is the fifth waypoint 1115. Initially, the aircraft 200 is proceeding outside of the lateral track-deviation zone 1120, and upstream of the reference line 1130. No particular speed constraint is applied to it. Neither is any speed constraint applied to it when it crosses the reference line 1130, the aircraft still proceeding outside of the lateral track-deviation zone 1120. As soon as the aircraft 200 crosses the first maximum lateral trajectory 1121, then the speed constraint imposed at the level of the third waypoint 1113 is applied to it.

For a sixth position 1106, the aircraft 200 is following a divergent trajectory with respect to the trajectory of the flight plan 1110, and is situated outside of the lateral track-deviation zone 1120, and downstream of the reference line 1130. In this example, a rejoining trajectory has been determined by the rejoining method according to the invention, and the waypoint designated for the rejoining is the sixth waypoint 1116. Initially, the aircraft 200 is proceeding outside of the lateral track-deviation zone 1120, consequently no particular speed constraint is applied to it. As soon as the aircraft 200 crosses the first maximum lateral trajectory 1121, it then proceeding downstream of the reference line 1130, the speed directive imposed at the level of the third waypoint 1113 is applied to it.

For a seventh position 1107, the aircraft 200 is following a divergent trajectory with respect to the trajectory of the flight plan 1110, and is situated in the lateral track-deviation zone 1120, and downstream of the reference line 1130. In this example, the rejoining method according to the invention was unable to determine any rejoining trajectory. Initially, the speed constraint imposed at the level of the third waypoint 1113 is applied to the aircraft 200, until the latter crosses the first maximum lateral trajectory 1121, thus leaving the lateral track-deviation zone 1120. From this point, no particular speed constraint is applied.

For an eighth position 1108, the aircraft 200 is following a divergent trajectory with respect to the trajectory of the flight plan 1110, and is situated in the lateral track-deviation zone 1120, and upstream of the reference line 1130. In this example, a rejoining trajectory has been determined by the rejoining method according to the invention, and the waypoint designated for the rejoining is the fourth waypoint 1114. Initially, no particular speed constraint is applied to the aircraft 200, the latter proceeding upstream of the reference line 1130. As soon as the aircraft 200 crosses the reference line 1130, the speed directive imposed at the level of the third waypoint 1113 is applied to it.

For a ninth position 1109, the aircraft 200 is following a divergent trajectory with respect to the trajectory of the flight plan 1110, and is situated in the lateral track-deviation zone 1120, and upstream of the reference line 1130. In this example, a rejoining trajectory has been determined by the rejoining method according to the invention, and the waypoint designated for the rejoining is the sixth waypoint 1116. This situation implies that the speed constraint imposed at the level of the third waypoint 1113 is applied to the aircraft 200.

FIG. 12a presents a logic diagram illustrating an exemplary rejoining method with application of speed constraints, for a departure procedure, according to an embodiment of the invention.

When a speed constraint is imposed at the level of a waypoint of the trajectory of a flight plan, in a departure procedure, a first assessment 1201 of the presence of the aircraft in the lateral track-deviation zone XTK is carried out. If the aircraft is present in the lateral track-deviation zone, then a second assessment 1202 of the presence of the aircraft upstream of the reference line is carried out. If the aircraft is then situated upstream of the reference line, then the speed constraint is applied to it; otherwise then the speed constraint is ignored. In the same manner, if the aircraft is not situated in the lateral track-deviation zone, the speed constraint is ignored. In such a situation where the speed constraint is ignored, a third assessment 1203 of the existence of a speed constraint at the level of a downstream waypoint can be carried out. If a downstream waypoint exists, at the level of which a speed constraint exists, then the first assessment 1201 of the presence of the aircraft in the deviation zone is carried out, in a manner identical to the process described above. If no downstream waypoint exists, at the level of which a speed constraint exists, then no particular speed constraint is applied to the aircraft.

FIG. 12b presents a logic diagram illustrating an exemplary rejoining method with application of speed constraints, for an arrival procedure, according to an embodiment of the invention.

When a speed constraint is imposed at the level of a waypoint of the trajectory of a flight plan, in an arrival procedure, a first assessment 1211 of the presence of the aircraft in the lateral track-deviation zone XTK is carried out. If the aircraft is present in the lateral track-deviation zone, then a second assessment 1212 of the presence of the aircraft downstream of the reference line is carried out. If the aircraft is then situated downstream of the reference line, then the speed constraint is applied to it; otherwise then the speed constraint is ignored. In the same manner, if the aircraft is not situated in the lateral track-deviation zone, the speed constraint is ignored.

As regards the display of the speed constraints, for example via the display screen of the man-machine interface 120 of the FMS 100, with reference to FIG. 1: the speed constraints can be displayed on the current trajectory of the aircraft, in modes of HDG or TRK type. They can also be displayed on the trajectory for rejoining the trajectory of the flight plan. When a controlled navigation mode of NAV Mode type is engaged, the trajectory for rejoining the trajectory of the flight plan becomes the current trajectory of the aircraft, and the speed constraints can be displayed on this trajectory.

Figure 13:
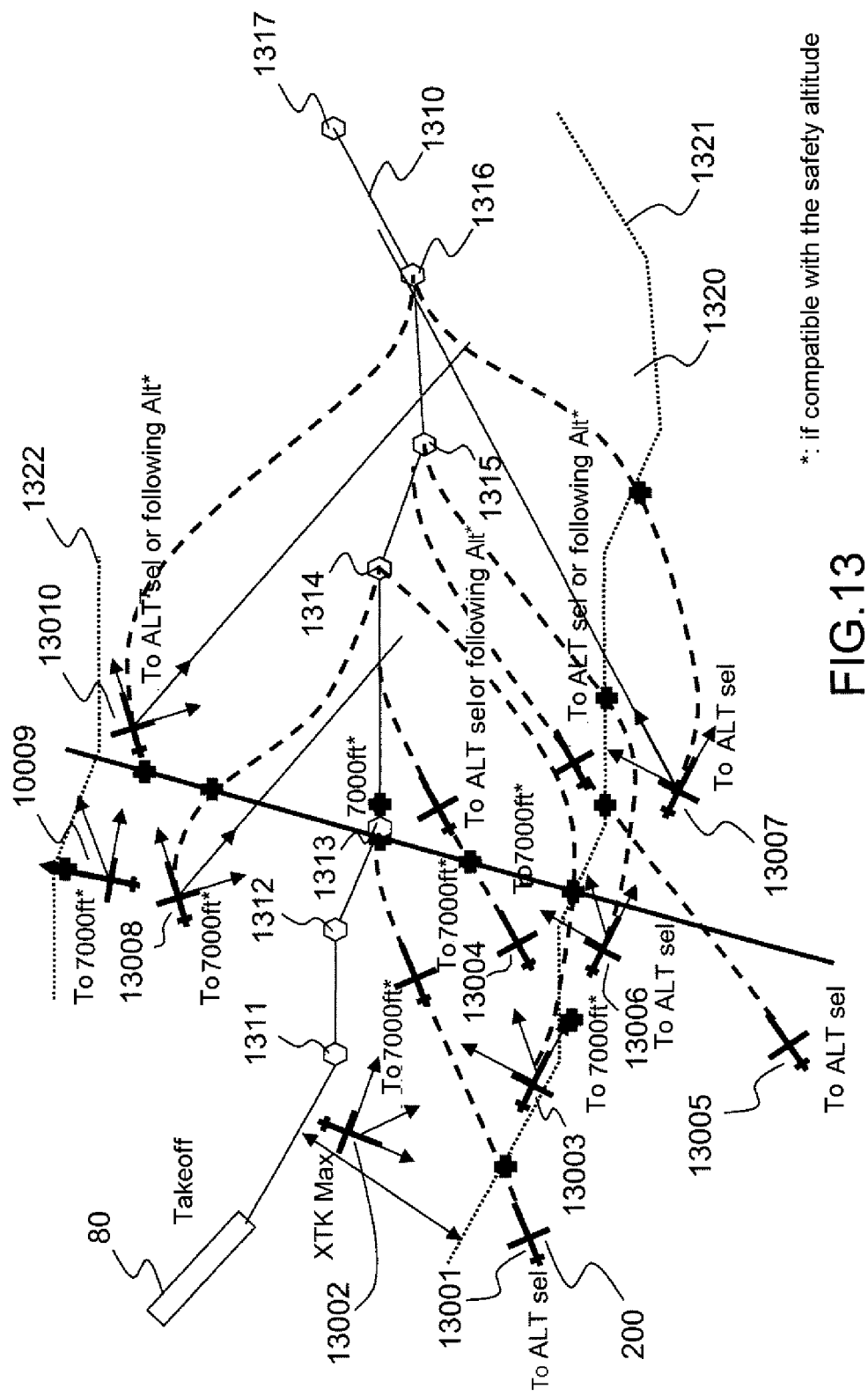
FIG. 13, viewed from above, the lateral flight profile of the aircraft and its altitude for various examples of positions with respect to an exemplary flight plan trajectory for a departure procedure.

FIG. 13 presents a view from above illustrating the lateral flight profile of the aircraft and its altitude for various examples of positions with respect to an exemplary flight plan trajectory for a departure procedure.

In an embodiment of the invention, there is proposed a trajectory rejoining method taking altitude constraints into account. Indeed, altitude constraints can be applied for passing particular waypoints, for example on request of the air traffic control bodies. Also, altitude constraints of a regulatory nature may be present along the flight plan. This embodiment of the invention is illustrated in accordance with examples corresponding respectively to takeoff and landing phases, by FIGS. 13 and 14. FIG. 15 presents a summary logic diagram of the method.

Altitude constraints can be taken into account in a manner similar to the way in which speed constraints are taken into account according to the embodiment of the invention described previously with reference to FIGS. 10, 11, 12a and 12b. A specific feature is related to the possible consideration of the altitude adjusted via the selector, usually designated "Alt Sel", and of the possible safety altitude specific to a geographical sector. Another specific feature is related to the possible existence of safety altitudes to be complied with in particular flight sectors. Safety altitudes are always imposed on the aircraft by priority if they are not compatible with the constrained altitudes at the level of waypoints.

FIG. 13 presents a view from above illustrating the lateral flight profile of the aircraft and its speed for various examples of positions with respect to an exemplary flight plan trajectory for an arrival procedure.

Various examples of positions 13001 to 13010 of the aircraft 200, flying at various altitudes and following various trajectories after takeoff from a runway 80, allow a better understanding of the rejoining method according to an embodiment of the invention. A series of waypoints 1311 to 1317 defines a flight plan trajectory 1310.

A lateral track-deviation zone 1320 is defined on the basis of the trajectory of the flight plan 1310. The lateral track-deviation zone 1320 is delimited by two maximum lateral trajectories 1321 and 1322, parallel to the trajectory of the flight plan 1310, typically at a lesser distance therefrom, in comparison with the lateral track-deviation zone defined for the consideration of speed constraints according to a previously described embodiment of the invention. In the example of FIG. 13, an altitude constraint of 7000 feet is imposed at the level of the third waypoint 1313. A reference line 1330 can be defined as the bisector formed at the third waypoint 1313, between the leg preceding and the leg following this waypoint.

For a first position 13001, the aircraft 200 is following a convergent trajectory with respect to the trajectory of the flight plan 1310, and is situated outside of the lateral track-deviation zone 1320, and upstream of the reference line 1330. A rejoining trajectory has been determined by the rejoining method such as described previously. The third waypoint 1313 has been determined for the rejoining, and an optimal lateral profile has been determined by the FMS. In the example of the figure, when the aircraft 200 is proceeding outside of the lateral track-deviation zone 1320, no particular altitude constraint is applied to it, or else an altitude constraint Alt Sel is applied to it, if such an altitude exists. As soon as the aircraft 200 reaches the first maximum lateral trajectory 1321, it is the altitude constraint imposed at the level of the third waypoint 1013 which is imposed on it, given that the aircraft 200 is then still situated upstream of the reference line 1330. This altitude constraint is applied to it until it reaches the third waypoint 1313 so as to rejoin the trajectory of the flight plan 1310. Of course, if in this zone a safety altitude to be complied with exists, it is the latter which is taken into account by priority.

For a second position 13002, the aircraft 200 is following a divergent trajectory with respect to the trajectory of the flight plan 1310, and is situated in the lateral track-deviation zone 1320, and upstream of the reference line 1330. In this example, the rejoining method was unable to determine any rejoining trajectory. The altitude constraint applied for the aircraft 200 is then the constraint imposed at the level of the third waypoint 1313, as long as the aircraft is proceeding inside the lateral track-deviation zone 1320. If in this zone a safety altitude exists, it is taken into account by priority. As soon as the aircraft 200 crosses the first maximum lateral trajectory 1321, no particular altitude constraint is applied to it.

For a third position 13003, the aircraft 200 is following a divergent trajectory with respect to the trajectory of the flight plan 1310, and is situated in the lateral track-deviation zone 1320, and upstream of the reference line 1330. In this example, an optimal lateral flight profile has been determined for a rejoining of the trajectory of the flight plan 1310 via the fourth waypoint 1314. The flight trajectory stemming therefrom forces the aircraft to leave the lateral track-deviation zone 1320, and then to re-enter it. Initially, as long as the aircraft 200 is proceeding inside the lateral track-deviation zone 1320, the altitude constraint which is applied to it is that which is imposed at the level of the third waypoint 1313, with the proviso that it is compatible with a possible safety altitude in the sector in which the aircraft 200 is proceeding. When the aircraft 200 reaches the first maximum lateral trajectory 1321, and leaves the lateral track-deviation zone 1320, no particular altitude constraint is imposed on it. On the other hand, as soon as it re-enters the lateral track-deviation zone 1320, the altitude constraint imposed at the level of the third waypoint 1313 is applied to it again, also under the proviso of a possible safety altitude to be complied with in this sector. This altitude constraint is applied until the aircraft 200 crosses the reference line 1330. Henceforth, no particular altitude constraint is applied to it. If for example there exists another altitude constraint applied at the level of a waypoint situated downstream along the trajectory of the flight plan 1310, then this constraint is applied to the aircraft 200. If there exists an altitude Alt Sel, then it is taken into account.

For a fourth position 13004, the aircraft 200 is following a convergent trajectory with respect to the trajectory of the flight plan 1310, and is situated in the lateral track-deviation zone 1320, and upstream of the reference line 1330. In this example, a point for rejoining the trajectory of the flight plan 1310 has been determined by an existing trajectory rejoining method, upstream of the fourth waypoint 1314. The altitude constraint applied to the aircraft 200 is the constraint imposed at the level of the third waypoint 1313, or else the altitude Alt Sel if one exists, until the aircraft 200 reaches the reference line 1330. Henceforth, no particular altitude constraint is applied to the aircraft 200, even if the latter is still proceeding within the lateral track-deviation zone 1320. It should also be noted that if there then exists an altitude constraint at the level of a downstream waypoint, or else an altitude Alt Sel, then such an altitude is imposed on the aircraft 200, still under the proviso of compatibility with a possible safety altitude imposed in the flight sectors considered.

For a fifth position 13005, the aircraft 200 is following a convergent trajectory with respect to the trajectory of the flight plan 1310, and is situated outside of the lateral track-deviation zone 1320, and upstream of the reference line 1330. In this example, an optimal lateral flight profile has been determined for a rejoining of the trajectory of the flight plan 1310 via the fifth waypoint 1315. Initially, no altitude constraint is applied to the aircraft 200, since the latter is proceeding outside of the lateral track-deviation zone 1320: only the altitude constraint Alt Sel is imposed, if one exists. When the aircraft 200 reaches the first maximum trajectory 1321, the altitude constraint Alt Sel is applied to it if one exists, or else an altitude constraint situated at a following waypoint, under the proviso of compatibility with a possible safety altitude.

For a sixth position 13006, the aircraft 200 is following a divergent trajectory with respect to the trajectory of the flight plan 1310, and is situated outside of the lateral track-deviation zone 1320, and upstream of the reference line 1330. In this example, an optimal lateral flight profile has been determined for a rejoining of the trajectory of the flight plan 1310 via the fifth waypoint 1315. Initially, no particular altitude constraint is applied to the aircraft 200, since the latter is proceeding outside of the lateral track-deviation zone 1320: only the altitude constraint Alt Sel is applied, if one exists. When the aircraft 200 reaches the first maximum trajectory 1321, no particular altitude constraint is applied to it either, since it is then situated downstream of the reference line 1330: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a seventh position 13007, the aircraft 200 is following a divergent trajectory with respect to the trajectory of the flight plan 1310, and is situated outside of the lateral track-deviation zone 1320, and downstream of the reference line 1330. In this example, an optimal lateral flight profile has been determined for a rejoining of the trajectory of the flight plan 1310 via the sixth waypoint 1316. Initially, no particular altitude constraint is applied to the aircraft 200, since the latter is proceeding outside of the lateral track-deviation zone 1320: only the altitude constraint Alt Sel is applied to it, if it exists. When the aircraft 200 reaches the first maximum trajectory 1321, no particular altitude constraint is applied to it either, since it is then situated downstream of the reference line 1330: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For an eighth position 13008, the aircraft 200 is following a divergent trajectory with respect to the trajectory of the flight plan 1310, and is situated in the lateral track-deviation zone 1320, and upstream of the reference line 1330. In this example, under the proviso of compatibility with a potential safety altitude to be complied with in the flight sector through which the aircraft 200 travels, the altitude constraint imposed at the level of the third waypoint 1313 is initially applied to the aircraft 200, the latter being situated in the lateral track-deviation zone 1320, and downstream of the reference line 1330. As soon as the aircraft 200 reaches the reference line 1330, no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a ninth position 13009, the aircraft 200 is following a divergent trajectory with respect to the trajectory of the flight plan 1310, and is situated in the lateral track-deviation zone 1320, and upstream of the reference line 1330. In this example, the rejoining method was unable to determine any rejoining trajectory. The altitude constraint applied for the aircraft 200 is then—under the proviso of compatibility with a possible safety altitude—the constraint applied at the level of the third waypoint 1313, as long as the aircraft is proceeding inside the lateral track-deviation zone 1320. As soon as the aircraft 200 reaches the second maximum lateral trajectory 1322, no particular altitude constraint is then applied to it.

For a tenth position 13010, the aircraft 200 is following a divergent trajectory with respect to the trajectory of the flight plan 1310, and is situated in the lateral track-deviation zone 1320, and downstream of the reference line 1330. In this example, no particular altitude constraint is applied to the aircraft 200, since the latter is proceeding downstream of the reference zone 1330: only a possible altitude constraint Alt Sel, or else an altitude constraint at the level of a following waypoint, is applied to it, under the proviso of compatibility with a possible safety altitude to be complied with in the flight sectors through which the aircraft 200 travels.

Figure 14:
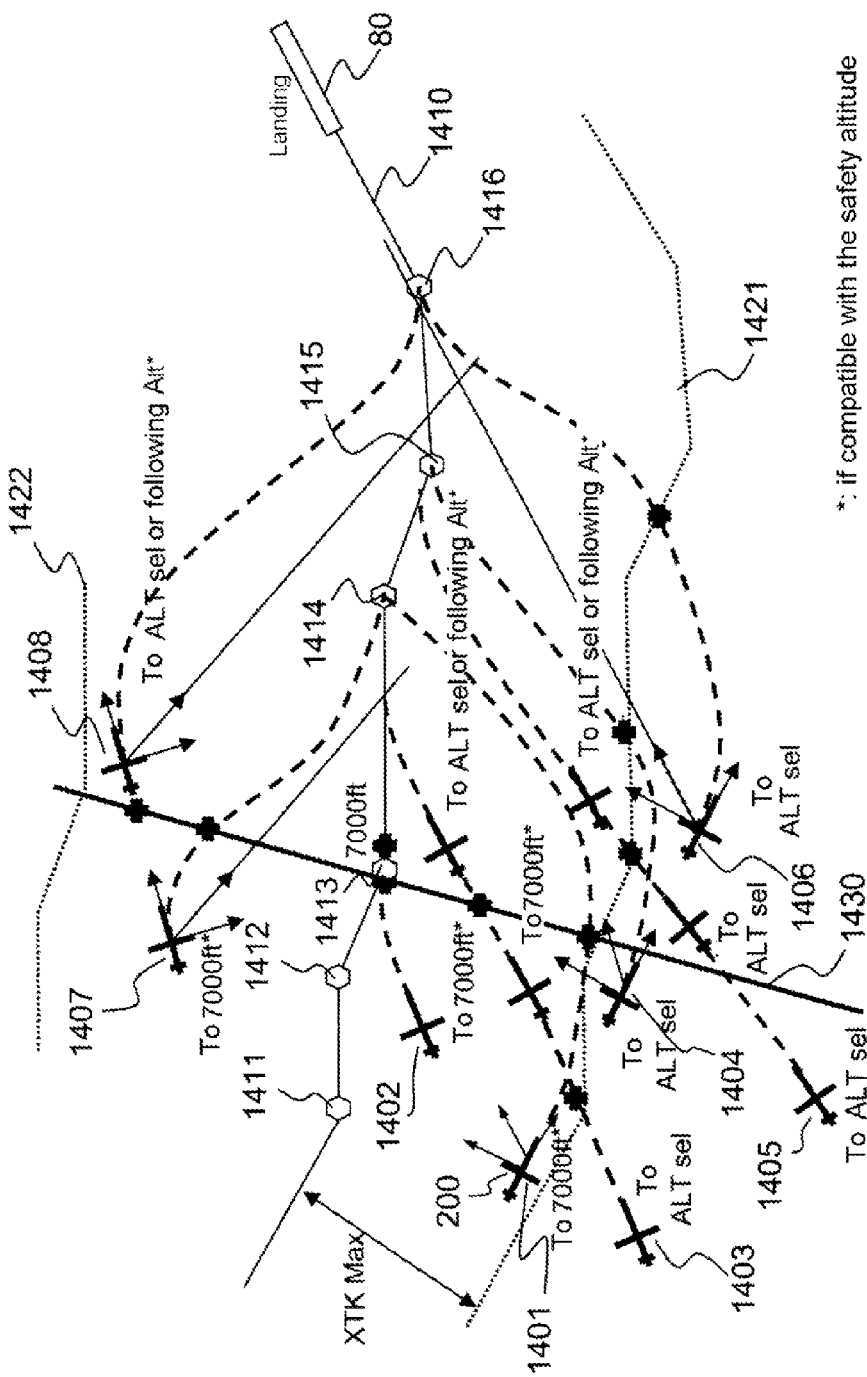
FIG. 14, viewed from above, the lateral flight profile of the aircraft and its speed for various examples of positions with respect to an exemplary flight plan trajectory for an arrival procedure.
Figure 15:
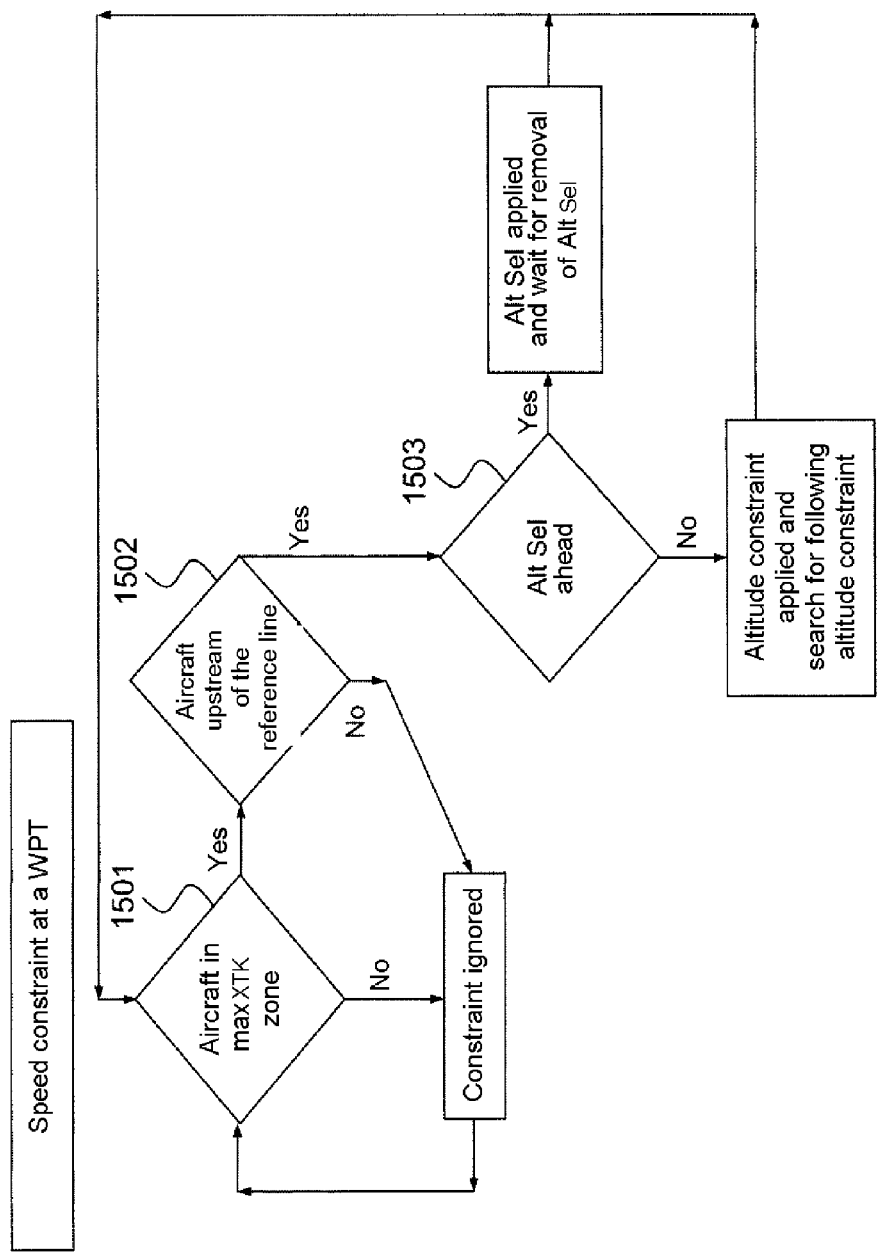
FIG. 15, a logic diagram illustrating an exemplary rejoining method with application of altitude constraints according to an embodiment of the invention.

FIG. 14 presents a view from above illustrating the lateral flight profile of the aircraft and its altitude for various examples of positions with respect to an exemplary flight plan trajectory for a departure procedure.

For a first position 1401, the aircraft 200 is following a divergent trajectory with respect to the trajectory of the flight plan 1410, and is situated in the lateral track-deviation zone 1420, and upstream of the reference line 1430. A rejoining trajectory has been determined by the rejoining method such as described previously. The fourth waypoint 1414 has been determined for the rejoining, and an optimal lateral profile has been determined by the FMS. In the example of the figure, initially, the altitude constraint imposed at the level of the third waypoint 1413 is applied to the aircraft 200, under the proviso of compatibility with a possible safety altitude. Thereafter, as soon as the aircraft 200 reaches the reference line 1430 no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a second position 1402, the aircraft 200 is following a convergent trajectory with respect to the trajectory of the flight plan 1410, and is situated in the lateral track-deviation zone 1420, and upstream of the reference line 1430. In this example, a rejoining trajectory has been determined by the rejoining method according to the invention, or by a known rejoining method. The waypoint designated for the rejoining is the third waypoint 1413. The altitude constraint imposed at the level of the third waypoint 1414 is applied to the aircraft 200, under the proviso of compatibility with a possible safety altitude. In this example, the aircraft then rejoins the trajectory of the flight plan at the level of the third waypoint 1413.

For a third position 1403, the aircraft 200 is following a convergent trajectory with respect to the trajectory of the flight plan 1410, and is situated outside of the lateral track-deviation zone 1420, and upstream of the reference line 1430. In this example, a rejoining trajectory has been determined by a known rejoining method, at a point of the trajectory of the flight plan 1410 situated upstream of the fourth waypoint 1414. Initially, no particular altitude constraint is applied to the aircraft 200: only the altitude constraint Alt Sel is applied, if one exists. When the aircraft 200 enters the lateral track-deviation zone 1420, the altitude constraint imposed at the level of the third waypoint 1413 is applied to it, under the proviso of compatibility with a possible safety altitude, as long as the aircraft 200 is proceeding upstream of the reference line 1430. As soon as it crosses the reference line 1430, no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a fourth position 1404, the aircraft 200 is following a divergent trajectory with respect to the trajectory of the flight plan 1410, and is situated outside of the lateral track-deviation zone 1420, and upstream of the reference line 1430. In this example, a rejoining trajectory has been determined by the rejoining method according to the invention, and the waypoint designated for the rejoining is the fifth waypoint 1415. Initially, the aircraft 200 is proceeding outside of the lateral track-deviation zone 1420, and upstream of the reference line 1430. No particular altitude constraint is applied to it: only the altitude constraint of type Alt Sel is applied, if one exists. No particular altitude constraint is applied to it either when it crosses the reference line 1430, the aircraft still proceeding outside of the lateral track-deviation zone 1420. As soon as the aircraft 200 crosses the first maximum lateral trajectory 1421, it is then situated downstream of the reference line 1430; consequently, no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a fifth position 1405, the aircraft 200 is following a convergent trajectory with respect to the trajectory of the flight plan 1410, and is situated outside of the lateral track-deviation zone 1420, and upstream of the reference line 1430.

In this example, a rejoining trajectory has been determined by the rejoining method according to the invention, and the waypoint designated for the rejoining is the fifth waypoint 1415. Initially, the aircraft 200 is proceeding outside of the lateral track-deviation zone 1420, and upstream of the reference line 1430. No particular altitude constraint is applied to it: only the altitude constraint of type Alt Sel is applied, if one exists. No particular altitude constraint is applied to it either when it crosses the reference line 1430, the aircraft still proceeding outside of the lateral track-deviation zone 1420. As soon as the aircraft 200 crosses the first maximum lateral trajectory 1421, it is then situated downstream of the reference line 1430; consequently, no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a sixth position 1406, the aircraft 200 is following a divergent trajectory with respect to the trajectory of the flight plan 1410, and is situated outside of the lateral track-deviation zone 1420, and downstream of the reference line 1430. In this example, a rejoining trajectory has been determined by the rejoining method according to the invention, and the waypoint designated for the rejoining is the sixth waypoint 1416. Initially, the aircraft 200 is proceeding outside of the lateral track-deviation zone 1420; consequently no particular altitude constraint is applied to it: only the altitude constraint of type Alt Sel is applied, if one exists. As soon as the aircraft 200 crosses the first maximum lateral trajectory 1421, it then proceeding downstream of the reference line 1430, no particular altitude constraint is applied to it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For a seventh position 1407, the aircraft 200 is following a divergent trajectory with respect to the trajectory of the flight plan 1410, and is situated in the lateral track-deviation zone 1420, and upstream of the reference line 1430. In this example, a rejoining trajectory has been determined by the rejoining method according to the invention, and the waypoint designated for the rejoining is the fourth waypoint 1414. Initially, the altitude constraint imposed at the level of the third waypoint 1413 is applied to the aircraft 200, under the proviso of compatibility with a possible safety altitude, the aircraft 200 proceeding upstream of the reference line 1430. As soon as the aircraft 200 crosses the reference line 1430, no particular altitude directive is imposed on it: only a possible altitude constraint Alt Sel, or else an altitude constraint at the level of a following waypoint, is applied to it, under the proviso of compatibility with a possible safety altitude to be complied with in the flight sectors through which the aircraft 200 travels.

For an eighth position 1408, the aircraft 200 is following a divergent trajectory with respect to the trajectory of the flight plan 1410, and is situated in the lateral track-deviation zone 1420, and upstream of the reference line 1430. In this example, a rejoining trajectory has been determined by the rejoining method according to the invention, and the waypoint designated for the rejoining is the sixth waypoint 1416. This situation implies that no particular altitude constraint is imposed on the aircraft 200: only a possible altitude constraint Alt Sel, or else an altitude constraint at the level of a following waypoint, is applied to it, under the proviso of compatibility with a possible safety altitude to be complied with in the flight sectors through which the aircraft 200 travels.

FIG. 15 presents a logic diagram illustrating an exemplary rejoining method with application of altitude constraints according to an embodiment of the invention.

When an altitude constraint is imposed at the level of a waypoint of the trajectory of a flight plan, in a departure procedure as in an arrival procedure, a first assessment 1501 of the presence of the aircraft in the lateral track-deviation zone XTK is carried out. If the aircraft is present in the lateral track-deviation zone, then a second assessment 1502 of the presence of the aircraft upstream of the reference line is carried out. If the aircraft is then situated upstream of the reference line, then a third assessment 1503 of the presence of an altitude constraint input into the selector is carried out. If an altitude constraint of type Alt Sel exists, then this constraint is applied, until it is removed, in which case the first assessment 1501 is carried out, and so on and so forth. If no altitude constraint of type Alt Sel exists, then the altitude constraint imposed at the level of the waypoint is applied to the aircraft. If it is apparent from first assessment 1501 that the aircraft is not situated in the lateral track-deviation zone, or else from the assessment 1502 that the aircraft is not situated upstream of the reference line, then the altitude constraint is ignored.

As regards the display of the altitude constraints, for example via the display screen of the man-machine interface 120 of the FMS 100, with reference to FIG. 1: the altitude constraints can be displayed on the current trajectory of the aircraft, in modes of HDG or TRK type; these altitude constraints also include the constraints input via the selector. They can also be displayed on the trajectory for rejoining the trajectory of the flight plan. When a controlled navigation mode of NAV Mode type is engaged, the trajectory for rejoining the trajectory of the flight plan becomes the current trajectory of the aircraft, and the altitude constraints can be displayed on this trajectory.

A typical use of a method such as described in the embodiments of the invention that were presented above with reference to the previous figures is described hereinafter.

When the departure of an aircraft is followed using radar guidance, the pilot prepares the desired heading and activates the HDG mode.

With the systems of FMS type known from the prior art, if the trajectory of the aircraft is convergent, it culminates naturally in the trajectory of the flight plan which will be captured if the NAV mode has been engaged.

If the trajectory of the aircraft is divergent, the rejoining is proposed on consideration of a direct rejoining, commonly designated "Direct To" of the appropriate point of the flight plan. With each heading adjustment the "Direct To" trajectory is adapted, the linkup point of the flight plan possibly changing over time.

When the pilot is authorized to rejoin the flight plan, if he engages the NAV mode this mode is activated directly and the rejoining trajectory locks so as to be followed. By default he can advance by a "Direct To" to any point of the flight plan.

If the pilot decides not to fly according to this locked rejoining section but rather to continue in HDG mode, then he re-activates the HDG mode, and the "Direct To" is reconstructed to the appropriate point in an alterable manner. Selecting the NAV mode then enables the "Direct To" rejoining trajectory to be locked again.

Vertical navigation can take place in a controlled manner according to the profile of the flight plan, even in a lateral flight mode of HDG or TRK type, the rejoining section being considered to be a part of the flight plan. The altitude and speed constraints at the points are included according to the modalities explained previously with reference to the various embodiments of the invention.

If the pilot does not wish to take account of the altitude and speed constraints along the flight plan rejoining section, then he has the possibility of deleting them at the level of the waypoint of the flight plan from which they arose.

The calculation of the predictions notably in terms of flight time and consumption, at the waypoints of the flight plan up to the destination, considers that the lateral and vertical rejoining trajectory is realized up to the rejoining point, from which the trajectory of the initially scheduled flight plan is followed.

While cruising and while descending, the pilot can use the method according to one of the embodiments of the invention, according to the same criteria facilitating the rejoining of the flight plan when authorized to do so by the air traffic control bodies.

The invention claimed is:

1. A flight management system for an aircraft configured for formulating a lateral flight trajectory for rejoining an aircraft to a trajectory of a flight plan comprising a plurality of waypoints, the aircraft flying outside of the flight plan and according to a divergent track with respect to the trajectory of the flight plan, comprising:
a system configured to determine a waypoint of the flight plan for the rejoining, defined as a first waypoint of the flight plan included in a capture zone defined by the flight plan trajectory situated downstream of a point of intersection between a straight line defined by an angle β with a perpendicular to a track of the aircraft and the trajectory of the flight plan, and
the system is further configured to formulate an optimal lateral flight trajectory for the rejoining by the aircraft at the determined waypoint.

2. The flight management system according to claim 1, in which the capture zone is extended if no waypoint was able to be determined for the rejoining, an extended capture zone being defined by a decrease in said angle α, by an angular value $\theta_{MAX}$ at most equal to the angle α, the system further configured to determine a waypoint for the rejoining, defined as the first waypoint included in the extended capture zone.

3. The flight management system according to claim 1, in which the capture zone is extended if a waypoint has been determined for the rejoining, but that said waypoint is situated at a distance from the aircraft greater than a separation criterion, an extended capture zone being defined by a decrease in said angle α, by an angular value $\theta_{MAX}$ at most equal to the angle α, the system further configured to determine a new waypoint for the rejoining, defined as the first waypoint included in the extended capture zone.

4. The flight management system according to claim 3, in which said waypoint determined for the rejoining, or said new waypoint determined, is ignored if it is separated from the aircraft by a distance greater than the separation criterion, or if it is separated from the aircraft by a distance less than a proximity criterion.

5. The flight management system according to claim 1, in which said angle α has a predetermined value lying between 0° and 90°.

6. The flight management system according to claim 1, in which said angle α has a predetermined value lying between 0° and 45°.

7. The flight management system according to claim 3, in which said separation criterion is a predetermined distance.

8. The flight management system according to claim 4, in which said proximity criterion is a predetermined distance.

9. The flight management system according to claim 3, in which said separation criterion corresponds to a distance travelled by the aircraft at its current speed for a determined duration.

10. The flight management system according to claim 3, in which said separation criterion has a value determined by the system as a function of parameters having an influence on the flight performance of the aircraft.

11. The flight management system according to claim 4, in which said proximity criterion corresponds to a distance travelled by the aircraft at its current speed for a determined duration.

12. The flight management system according to claim 4, in which said proximity criterion has a value determined by the system as a function of parameters having an influence on the flight performance of the aircraft.

13. The flight management system according to claim 2, in which said angular value $\theta_{MAX}$ has a predetermined value.

14. The flight management system according to claim 2, in which said angular value $\theta_{MAX}$ has a value determined by the system as a function of parameters having an influence on the flight performance of the aircraft.

15. The flight management system according to claim 1, said system further configured to determine a speed constraint to be applied to the aircraft equal to a speed constraint imposed at the level of the next waypoint of the flight plan situated downstream of the aircraft, at the level of which a speed constraint is imposed:
if the aircraft is in the departure phase, and is situated inside a lateral track-deviation zone delimited by two maximum lateral trajectories parallel to the trajectory of the flight plan and situated at a determined distance on either side of the latter, and is situated upstream of a reference line passing through said waypoint of the flight plan at the level of which a speed constraint is imposed; or
if the aircraft is in the arrival phase, and is situated inside the lateral track-deviation zone, and is situated downstream of the reference line.

16. The flight management system according to claim 1, said system further configured to determine an altitude constraint to be applied to the aircraft equal to an altitude constraint imposed at the level of the next waypoint of the flight plan situated downstream of the aircraft, at the level of which an altitude constraint is imposed, if the aircraft is situated inside the lateral track-deviation zone, and is situated upstream of a reference line passing through said waypoint of the flight plan at the level of which an altitude constraint is imposed.

17. The flight management system according to claim 12, in which said reference line is defined as a bisector of two segments of the flight plan situated respectively directly upstream and downstream of the waypoint at the level of which at least one of the speed and altitude constraint is imposed.

18. A flight management system for an aircraft configured for formulating a lateral flight trajectory for rejoining an aircraft to a trajectory of a flight plan comprising a plurality of waypoints, the aircraft flying outside of the flight plan and according to a divergent track with respect to the trajectory of the flight plan, comprising:
a system configured to determine a waypoint of the flight plan for the rejoining, defined as a first waypoint of the flight plan included in a capture zone defined by the flight plan trajectory situated downstream of a point of intersection between a straight line defined by an angle α with a perpendicular to a track of the aircraft and the trajectory of the flight plan, and the system is further configured to formulate an optimal lateral flight trajectory for the rejoining by the aircraft at the determined waypoint, wherein the capture zone is extended if a waypoint has been determined for the rejoining, but that said waypoint is situated at a distance from the aircraft greater than a separation criterion, an extended capture zone being defined by a decrease in said angle α, by an angular value $\theta_{MAX}$ at most equal to the angle α, the system further configured to determine a new waypoint for the rejoining, defined as the first waypoint included in the extended capture zone.

19. A flight management system for an aircraft configured for formulating a lateral flight trajectory for rejoining an aircraft to a trajectory of a flight plan comprising a plurality of waypoints, the aircraft flying outside of the flight plan and according to a divergent track with respect to the trajectory of the flight plan, comprising:

a system configured to determine a waypoint of the flight plan for the rejoining, defined as a first waypoint of the flight plan included in a capture zone defined by the flight plan trajectory situated downstream of a point of intersection between a straight line defined by an angle α with a perpendicular to a track of the aircraft and the trajectory of the flight plan;

the system is further configured to formulate an optimal lateral flight trajectory for the rejoining by the aircraft at the determined waypoint; and said system further configured to determine an altitude constraint to be applied to the aircraft equal to an altitude constraint imposed at the level of the next waypoint of the flight plan situated downstream of the aircraft, at the level of which an altitude constraint is imposed, if the aircraft is situated inside the lateral track-deviation zone, and is situated upstream of a reference line passing through said waypoint of the flight plan at the level of which an altitude constraint is imposed.

* * * * *